US008207494B2

(12) United States Patent
Hieftje et al.

(10) Patent No.: US 8,207,494 B2
(45) Date of Patent: Jun. 26, 2012

(54) LASER ABLATION FLOWING ATMOSPHERIC-PRESSURE AFTERGLOW FOR AMBIENT MASS SPECTROMETRY

(75) Inventors: Gary M. Hieftje, Bloomington, IN (US); Francisco J. Andrade, Leeds (GB); Steven J. Ray, Bloomington, IN (US); Jacob T. Shelley, Bloomington, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 354 days.

(21) Appl. No.: 12/387,348

(22) Filed: May 1, 2009

(65) Prior Publication Data

US 2009/0272893 A1 Nov. 5, 2009

Related U.S. Application Data

(60) Provisional application No. 61/049,595, filed on May 1, 2008.

(51) Int. Cl.
*B01D 59/44* (2006.01)
*H01J 49/00* (2006.01)

(52) U.S. Cl. ........ 250/282; 250/281; 250/283; 250/287; 250/288; 250/290; 250/291; 250/292

(58) Field of Classification Search .......... 250/281-283, 250/287, 288, 290-292
See application file for complete search history.

(56) References Cited

U.S. PATENT DOCUMENTS 5,192,865 A * 3/1993 Zhu .............................. 250/288
2006/0108538 A1* 5/2006 Hayashizaki et al. ..... 250/423 P

OTHER PUBLICATIONS

Anderson, C., M. Hur, P. Zhang, L. Mangolini, and U. Kortshagen, "Two-Dimensional Space-Time-Resolved Emission Spectroscopy on Atmospheric Pressure Glows in Helium with Impurities", Journal of Applied Physics, vol. 96, No. 4, 2004, pp. 1835-1839.
Andrade, F. J., W. C. Wetzel, G. C. Y. Chan. M R Webb, G Gamez, S. J. Ray, G. M. Hieftje, "A New, Versatile, Direct-Current Helium Atmospheric-Pressure Glow Discharge", Journal of Analytical Atomic Spectrometry, vol. 21, 2006, pp. 1175-1184.
Andrade. F J.; Shelley, J. T.; Wetzel, W. C.; Webb, M. R.; Garnez, G.; Ray, S J.; Hieftje, G. M , "Atmospheric Pressure Chemical Ionization Source. 1. Ionization of Compounds in the Gas Phase." Analytical Chemistry 2008, vol. 80, No. 8, 2646-2653.
Andrade, F. J.; Shelley, J. T.; Wetzel, W. C.; Webb, M. R.; Gamez, G.; Ray, S J.; Hieftje, G. M., "Atmospheric Pressure Chemical Ionization Source. 2. Desorption—Ionization for the Direct Analysis of Solid Compounds," Analytical Chemistry 2008, vol. 80, No. 8, 2654-2663.

(Continued)

*Primary Examiner* — Jack Berman
*Assistant Examiner* — Meenakshi Sahu
(74) *Attorney, Agent, or Firm* — Barnes & Thornburg LLP

(57) ABSTRACT

Disclosed is an apparatus for performing mass spectrometry and a method of analyzing a sample through mass spectrometry. In particular, the disclosure relates to an apparatus capable of ambient mass spectrometry and mass spectral imaging and a method for the same. The apparatus couples laser ablation, flowing atmospheric-pressure afterglow ionization, and a mass spectrometer.

29 Claims, 17 Drawing Sheets
(5 of 17 Drawing Sheet(s) Filed in Color)

OTHER PUBLICATIONS

Barnes, J. H.; Schilling, G. D.; Hieftje, G. M.; Sperline, R. P.; Denton, M. B., Barinaga, C. J.; Koppenaal, D. W., "Use of a Novel Array Detector for the Direct Analysis of Solid Samples by Laser Ablation Inductively Coupled Plasma Sector-Field Mass Spectrometry," American Society for Mass Spectrometry 2004, vol. 15, 769-776.
Bleiner, D.; Plotnikov, A.; Vogt, C.; Wetzig, K.; Gunther, D., "Depth Profile Analysis of Various Titanium Based Coatings on Steel and Tungsten Carbide Using Laser Ablation Inductively Coupled Plasma—"Time of Flight" Mass Spectrometry," J. Anal Chem 2000, vol. 368, 221-226.
Boyle, W. S., and F. E. Haworth, "Glow-To-Arc Transition", Physical Review, vol. 101, No. 3, 1956, pp. 935-938.
Brewer, T. M., Castro, and R. K. Marcus, "Particle Beam Sample Introduction into Glow Discharge Plasmas for Speciation Analysis", Spectrochimica Acta Part B, vol. 61, 2006, pp. 134-149.
Bruins. A. P., "Atmospheric-Pressure-Ionization Mass Spectrometry" Trends in Analytical Chemistry, vol. 13, No. 1, 1994, pp. 37-43.
Bystroff, R. I., L. R. Layman. and G. M. Hieftje. "Investigation into the Operating Characteristics of a "Microarc" Atmospheric-Pressure Glow Discharge", Applied Spectroscopy, vol. 33, No. 3, 1979, pp. 230-240.
Caprioli, R. M.; Farmer, T. B.; Gile, J., "Molecular Imaging of Biological Samples: Localization of Peptides and Proteins Using MALDI-T of MS," Anal. Chem. 1997, vol. 69, 4751-4760.
Carroll, D. I., I. Dzidic, R. N. Stillwell, K. D. Haegele, and E. C. Horning, "Atmospheric Pressure Ionization Mass Spectrometry: Corona Discharge Ion Source for Use in Liquid Chromatograph-Mass Spectrometer-Computer Analytical System" Analytical Chemistry, vol. 47, No. 14, 1975, pp. 2369-2373.
Chen, H., N. N. Talaty, Z. Takats, and R. G. Cooks, "Desorption Electrospray Ionization Mass Spectrometry for High-Throughput Analysis of Pharmaceutical Samples in the Ambient Environment", Anal. Chem., vol. 77, No. 21, 2005, pp. 6915-6927.
Cody, R. B., J. A Laramee and H. D Durst, "Versatile New Ion Source for the Analysis of Materials in Open Air Under Ambient Conditions", Anal. Chem vol. 77, No. 8, 2005, pp. 2297-2302.
Collins, C B., and W. W Robertson, "Spectra Excited in a Helium Afterglow", The Journal of Chemical Physics, vol. 40, No. 3, 1964, pp. 701-712.
Conrads, H., and M. Schmidt, "Plasma Generation and Plasma Sources", Plasma Sources Sci. Technol., vol. 9, 2000, pp. 441-454.
Cooks, R. G., Z. Ouyang, Z. Takats, J. M. Wiseman, "Ambient Mass Spectrometry", Science, vol. 311, 2006, pp. 1566-1570.
Costa, A. B.; Cooks, R. G., "Simulation of Atmospheric Transport and Droplet-Thin Film Collisions in Desorption Electrospray Ionization," Chemical Communications 2007, 3915-3917.
Cotte-Rodriguez, I., and R. G. Cooks, "Non-Proximate Detection of Explosives and Chemical Warfare Agent Simulants by Desorption Electrospray Ionization Mass Spectrometry", Chem. Commun, 2006, pp. 2968-2970.
Dothan, F., and Y. M. Kagan, "Composition of the Positive Column of a Helium Glow Discharge at Intermediate Pressures", J. Phys. D: Appl. Phys., vol. 12, 1979, pp. 2155-2166.
Ennis, C. J., J. C. Reynolds, B. J. Keely, L. J. Carpenter, "A Hollow Cathode Proton Transfer Reaction Time of Flight Mass Spectrometer", International Journal of Mass Spectrometry, vol. 247, 2005, pp. 72-80.
Fan, H. Y., "The Transition from Glow Discharge to Arc", Physical Review, vol. 55, 1939, pp. 769-775.
Franzke, J., K. Kunze, M. Miclea, and K. Niemax, "Microplasmas for Analytical Spectrometry", J. Anal. At. Spectrom., vol. 18, 2003, pp. 802-807.
Golubovskii, Y. B., V. A. Maiorov, J. Behnke, and J. F. Behnke, "Modelling of the Homogeneous Barrier Discharge in Helium at Atmospheric Pressure", Journal of Physics D: Applied Physics, vol. 36, 2003, pp. 39-49.
Good, A., D. A. Durden, and P. Kebarle, "Mechanism and Rate Constants of Ion-Molecule Reactions Leading to Formation of $H+(H_2O)_n$ in Moist Oxygen and Air", Journal of Chemical Physics, vol. 52, No. 1, 1970, pp. 222-229.
Guevremont, R. and R. E. Sturgeon, "Atmospheric Pressure Helium RF Plasma Source for Atomic and Molecular Mass Spectrometry", J. Anal. At. Spectrom, vol. 15, 2000, pp. 37-42.
Guzowski Jr., J. P, and G. M. Hieftje, "Characterization of Switched Direct Current Gas Sampling Glow Discharge Ionization Source for the Time-Of-Flight Mass Spectrometer", J. Anal. At. Spectrom, vol. 15, 2000, pp. 27-36.
Hansel, A., A. Jordan, C. Warneke, R. Holzinger, A. Wisthaler, and W. Lindinger, "Proton-Transfer-Reaction Mass Spectrometry (PTR-MS): On-Line Monitoring of Volatile Organic Compounds at Volume Mixing Ratios of a Few pptv", Plasma Sources Sci. Technol., vol. 8, 1999, pp. 332-336.
Hansel, A., A. Jordan, R. Holzinger, P. Prazeller, W. Vogel, and W. Lindinger, "Proton Transfer Reaction Mass Spectrometry: On-Line Trace Gas Analysis at the ppb Level", International Journal of Mass Spectrometry and Ion Processes, vol. 149/150, 1995, pp. 609-619.
Haug; B., H. Morgner, and V. Staemmler, "Experimental and Theoretical Study of Penning Ionisation of $H_2O$ by Metastable Helium $He(2^3S)$", J. Phys, B: At. Mol. Phys., vol. 18, 1985, pp. 259-274.
Houk, R. S., and Y. Zhai, "Comparison of Mass Spectrometric and Optical Measurements of Temperature and Electron Density in the Inductively Coupled Plasma During Mass Spectrometric Sampling", Spectrochimica Acta Part B, vol. 56, 2001, pp. 1055-1067.
Ichikawa, Y., and S. Taii, "Molecular Ion and Metastable Atom Formations and Their Effects on the Electron Temperature in Medium-Pressure Rare-Gas Positive-Column Plasmas", J. Phys. D: Appl. Phys., vol. 13, 1980, pp. 2031-2043.
Ifa, D. R.; Gumaelius, L. M.; Eberlin, L. S.; Manicke, N, E.; Cooks, R. G., "Forensic Analysis of Inks by Imaging Desorption Electrospray Ionization (DESI) Mass Spectrometry," Analyst 2007, vol. 132, 461-467.
Kanazawa, S., M. Kogoma, T. Moriwaki, and S. Okazaki, "Stable Glow Plasma at Atmospheric Pressure", J. Phys. D: Appl. Phys., vol. 21, 1988, pp. 838-840.
Kauppila, T. J., J. M. Wiseman, R. A. Ketola, T. Kotiaho, R. G. Cooks and R. Kostiainen, "Desorption Electrospray Ionization Mass Spectrometry for the Analysis of Pharmaceuticals and Metabolites", Rapid Commun. Mass Spectrom., vol. 20, 2006, pp. 387-392.
Klinkert, I.; McDonnell, L. A.; Luxembourg, S. L., Attelaar, A. F. M.; Amstalden, E. R.; Piersma, S. R.; Heeren, R. M. A., "Tools and strategies for visualization of large image data sets in high-resolution imaging mass spectrometry," Rev. Sci. Instrum. 2007, vol. 78, 053716-1-053716-10.
Karanassios, V., "Microplasmas for Chemical Analysis: Analytical Tools or Research Toys?", Spectrochimica Acta Part B, vol. 59, 2004, pp. 909-928.
Kebarle, P., S. K. Searles, A. Zolla, J. Scarborough, and M. Arshadi, "The Solvation of the Hydrogen Ion by Water Molecules in the Gas Phase. Heats and Entropies of Solvation of Individual Reactions: $H^+(H_2O)_{n-1}+H_2O \rightarrow H^+(H_2O)_n$", Journal of Mass Spectrometry, vol. 32, 1997, pp. 915-921.
Kutasi. K., P. Hartmann, and Z. Donko, "Self-Consistent Modelling of Helium Discharges: Investigation of the Role of $He_2^+$ ions", J. Phys D: Appl Phys, vol. 34, 2001, p. 3368-3377.
Lawler. J. E., "Experimental and Theoretical Investigation of the Optogalvanic Effect in the Helium Positive Column", Physical Review A, vol. 22, No. 3, 1980, pp. 1025-1033.
Lawler, J. E., and U. Kortshagen, "Self-Consistent Monte Carlo Simulations of the Positive Column of Gas Discharges", J. Phys. D. Appl. Phys., vol. 32, 1999. pp. 3188-3198.
Layman, L. R. and G. M. Hieftje, "New, Computer-Controlled Microwave Discharge Emission Spectrometer Employing Microarc Sample Atomization for Trace and Micro Elemental Analysis", Analytical Chemistry. vol. 47, No. 2, 1975, pp. 194-202.
Lewis, C. L., M. A. Moser, W. Hang, D. E. Dale, Jr., D. C. Hassell, V. Majidi, "Influence of Discharge Parameters on Real-Time Chemical Speciation for Gas Chromatography Pulsed Glow Discharge Plasma Time-of-Flight Mass Spectrometry". J. Anal At. Spectrom., vol. 18, 2003, pp. 629-636.
Lewis, C. L., M. A. Moser, D. E. Dale, Jr., W. Hang, C. Hassell, F. L. King, and V. Majidi, "Time-Gated Pulsed Glow Discharge: Real-Time Chemical Speciation at the Elemental, Structural, and Molecular Level for Gas Chromatography Time-of-Flight Mass Spectrometry", Analytical Chemistry, vol. 75, No. 9, 2003, pp. 1983-1996.

Li, Y.; Shrestha, B.; Vertes, A., "Atmospheric Pressure Molecular Imaging by Infrared MALDI Mass Spectrometry," Anal. Chem. 2007, vol. 79, 523-532.

Luxembourg, S. L. Mize, T. H.; McDonnell, L. A.; Heeren, R. M. A. "High-Spatial Resolution Mass Spectrometric Imaging of Peptide and protein Distributions on a Surface," Anal. Chem., 2004, vol. 76, 5339-5344.

Majidi, V., M. Moser, C. Lewis, W. Hang, and F. L. King, "Explicit Chemical Speciation by Microsecond Pulsed Glow Discharge Time-of-Flight Mass Spectrometry: Concurrent Acquisition of Structural, Molecular and Elemental Information", J. Anal. At. Spectrom., vol. 15, 2000, pp. 19-25.

Mangolini L., C. Anderson, J. Heberlein, and U. Kortshagen, "Effects of Current Limitation Through the Dielectric in Atmospheric Pressure Glows in Helium", J. Phys. D: Appl. Phys., vol. 37, 2004, pp. 1021-1030.

Mangolini, L., K. Orlov, U. Kortshagen, J. Heberlein, and U. Kogelschatz, "Radial Structure of a Low-Frequency Atmospheric-Pressure Glow Discharge in Helium", Applied Physics Letters, vol. 80, No. 10, 2002, pp. 1722-1724.

Marcus, R. K., E. H. Evans, and J. A. Caruso, "Tunable Plasma Sources in Analytical Spectroscopy: Current Status and Projections", J. Anal. At. Spectrom, vol. 15, 2000, pp. 1-5.

Mason, R., and D. Milton, "Glow Discharge Mass Spectrometry of Some Organic Compounds", International Journal of Mass Spectrometry and Ion Processes, vol. 91, 1989, pp. 209-225.

Massines, F., A. Rabehi, P. Decomps, R. B. Gadri, P. Segur, and C Mayoux, "Experimental and Theoretical Study of a Glow Discharge at Atmospheric Pressure Controlled by Dielectric Barrier", Journal of Applied Physics, vol. 83, No. 6, 1998, pp. 2950-2957.

McDonnell, L. A , Heeren, R M. A, "Imaging Mass Spectrometry," Mass Spectrom. Rev. 2007, vol. 26, 606-643.

McLuckey, S. A., G. L. Glish, K G. Asano, and B. C. Grant. "Atmospheric Sampling Glow Discharge Ionization Source for the Determination of Trace Organic Compounds in Ambient Air", Anal. Chem. vol. 60, 1988, pp. 2220-2227.

Mezei, P., T. Cserfalvi, and M. Janossy, "On the Pressure Dependence of the Positive Column Cross Section in High-Pressure Glow Discharges", J. Phys. D: Appl. Phys., vol. 34, 2001, pp. 1914-1918.

Mezei. P., T. Cserfalvi, M. Janossy, K. Szocs, and H. J. Kim, "Similarity Laws for Glow Discharges with Cathodes of Metal and an Electrolyte". J. Phys. D: Appl. Phys., vol. 31, 1998, pp, 2818-2825.

Na, N.; Zhao, M. X.; Zhang, S.; Yang, C.; Zhang, X., "Development of a Dielectric Barrier Discharge Ion Source for Ambient Mass Spectrometry," J. Am. Soc. Mass. Spectrom. 2007, vol. 18, 1859-1862.

Nemes, P.; Vertes, A., "Laser Ablation Electrospray Ionization for Atmospheric Pressure, in Vivo, and Imaging Mass Spectrometry," Anal. Chem. 2007, vol. 79, 8098-8106.

Nersisyan, G., T. Morrow. and W. G. Graham, "Measurements of Helium Metastable Density in an Atmospheric Pressure Glow Discharge", Applied Physics Letters, vol. 85, No. 9, 2004, pp. 1487-1489.

Newman, K., and R. S. Mason, "Gas Chromatography Combined with Fast Flow Glow Discharge Mass Spectrometry (GC-FFGD-MS)", J. Anal. At. Spectrom., vol. 19, 2004, pp. 1134-1140.

Newman, K., and R. S. Mason, "Organotin Speciation Using Fast Flow Glow Discharge Mass Spectrometry", J. Anal. At. Spectrom., vol. 20, 2005, pp. 830-838.

Nicol, G., J. Sunner, and P. Kebarle, "Kinetics and Thermodynamics of Protonation Reactions: $H_3O^{+}(H_2O)_{h}+B=BH^{+}(H_2O)_{b}+(h-b+1)H_2O$, Where B is a Nitrogen, Oxygen or Carbon Base". International Journal of Mass Spectrometry and Ion Processes, vol. 84, 1988, pp. 135-155.

Okazaki, S., M. Kogoma, M. Uehara, and Y. Kimura, "Appearance of Stable Glow Discharge in Air, Argon, Oxygen and Nitrogen at Atmospheric Pressure Using a 50 Hz Source", J. Phys. D: Appl. Phys, vol. 26, 1993, pp, 889-892.

Popov, I. A., H. Chen, O. N. Kharybin, E. N. Nikolaev, and R. G. Cooks,"Detection of Explosives on Solid Surfaces by Thermal Desorption and Ambient Ion/Molecule Reactions", Chem. Commun., 2005, pp. 1953-1955.

Ratcliffe, L. V.; Rutten, F. J. M., Barrett, D. A.; Whitmore, T.; Seymour, D., Greenwood, C.: Aranda-Gonzalvo, Y.; Robinson, S.; McCoustra, M., "Surface Analysis Under Ambient Conditions Using Plasma-Assisted Desorption/Ionization Mass Spectrometry," Anal. Chem. 2007, vol. 79, 6094-6101.

Sofer, I., J. Zhu, H. S. Lee, W. Antos, and D. M. Lubman, "An Atmospheric-Pressure Glow Discharge Ionization Source", Applied Spectroscopy, vol. 44, No. 8, 1990, pp. 1391-1398.

Staack, D., B. Farouk, A. Gutsol, and A. Fridman, "Characterization of a DC Atmospheric Pressure Normal Glow Discharge", Plasma Sources Sci. Technol., vol. 14, 2005, pp. 700-711.

Stark, R. H., and K. H. Schoenbach, "Direct Current Glow Discharges in Atmospheric Air", Applied Physics Letters, vol. 74, No. 25. 1999, pp. 3770-3772.

Stark, R. H., and K. H. Schoenbach, "Direct Current High-Pressure Glow Discharges", Journal of Applied Physics, vol. 85, No. 4, 1999, pp. 2075-2060.

Steiner, R. E., C, L. Lewis, and V. Majidi, "Consideration of a Millisecond Pulsed Glow Discharge Time-of-Flight Mass Spectrometer for Concurrent Elemental and Molecular Analysis", J. Anal. At. Spectrom, vol. 14, 1999; pp. 1537-1541.

Stevefelt, J., J. M. Pouvesie, and A. Bouchoule "Reaction Kinetics of a High Pressure Helium Fast Discharge Afterglow", J. Chem. Phys., vol. 76, No. 8, 1982, pp. 4006-4015.

Sunner, J., G. Nicol, and P. Kebarle, "Factors Determining Relative Sensitivity of Analytes in Positive Mode Atmospheric Pressure Ionization Mass Spectrometry", Anal. Chem. vol. 60, 1988, pp. 1300-1307.

Takats, Z., J. M. Wiseman, and R. G. Cooks, "Ambient Mass Spectrometry Using Desorption Electrospray Ionization (DESI): Instrumentation, Mechanisms and Applications in Forensics, Chemistry, and Biology", J. Mass Spectrom. vol. 40, 2005, pp. 1261-1275.

Takats, Z., I. Cotte-Rodriguez, N. Talaty, H. Chen, and R. G. Cooks, "Direct, Trace Level Detection of Explosives on Ambient Surfaces by Desorption Electrospray Ionization Mass Spectrometry", Chem. Commun, 2005, pp. 1950-1952.

Takats, Z., J. M. Wiseman, B. Gologan, and R. G. Cooks, "Mass Spectrometry Sampling Under Ambient Conditions with Desorption Electrospray Ionization", Science, vol. 306, 2004, pp. 471-473.

Talaty, N., Z. Takats, and R. G. Cooks, "Rapid in Situ Detection of Alkaloids in Plant Tissue Under Ambient Conditions Using Desorption Electrospray Ionization", Analyst. vol. 130, 2005, pp. 1624-1633.

Van de Sande, M. J., P. van Eck, A. Sola, A. Gamero, J. J. A. M. van der Mullen, "Entrainment of Ambient Air into a Spectrochemical Inductively Coupled Argon Plasma", Spectrochimica Acta Part B, vol. 58, 2003, pp. 457-467.

Venter, A.; Sojka, P. E.; Cooks, R. G., "Droplet Dynamics and Ionization Mechanisms in Desorption Electrospray Ionization Mass Spectrometry," Anal. Chem 2006, vol. 78, 8549-8555.

Wagatsuma, K. and K. Hirokawa, "High Sensitivity Measurement of Atonic Emission Spectra with an Applied Voltage Modulation Technique", Anal. Chem. vol. 56, 1984, pp. 2732-2735.

Williams, J. P., V. J. Patel, R. Holland, and J. H. Scrivens, "The Use of Recently Described Ionisation Techniques for the Rapid Analysis of Some Common Drugs and Samples of Biological Origin", Rapid Commun. Mass Spectrom, vol. 20. 2006, pp. 1447-1456.

Wiseman, J. M.; Ifa, D. R.; Song, Q.; Cooks, R. G., "Tissue Imaging at Atmospheric Pressure Using Desorption Electrospray Ionization (DESI) Mass Spectrometry," Angewandte Chemie-International Edition 2006, vol. 45, 7188-7192.

Wiseman, J. M., S. M. Puolitaival, Z, Takats, R. G. Cooks, and R. M. Caprioli, "Mass Spectrometric Profiling of Intact biological Tissue by Using Desorption Electrospray Ionization", Angew. Chem. Int. Ed., vol. 44, 2005, pp. 7094-7097.

Yokoyama, T., M. Kogoma, T. Moriwaki, and S. Okazaki, "The Mechanism of the Stabilisation of Glow Plasma at Atmospheric Pressure", J. Phys. D: Appl. Phys, vol. 23, 1990, pp. 1125-1128.

Zhao, J., J. Zhu, and D. M. Lubman, "Liquid Sample Injection Using an Atmospheric Pressure Direct Curre Glow Discharge Ionization Source", Anal. Chem, vol. 64, 1992, pp. 1426-1433.

* cited by examiner

Acetaminophen

Caffeine
Signal (Counts)
Time (sec)
600
500
400
300
200
100
0
1 10^4
8000
6000
4000
2000
0
5000
4000
3000
2000
1000
0
0
200
400
600
800
1000

Figure 15A
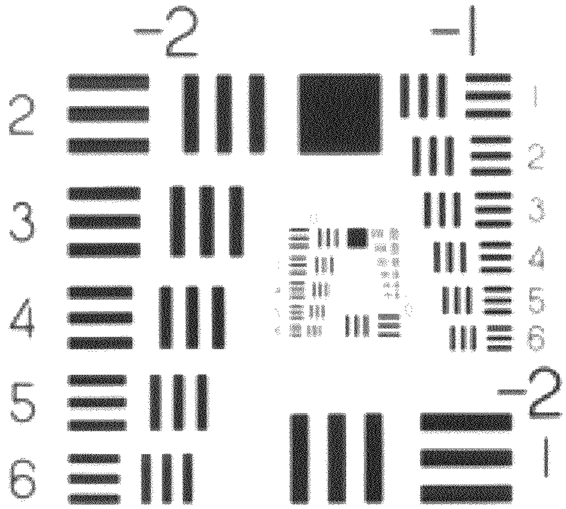
Figure 15C
Figure 15B
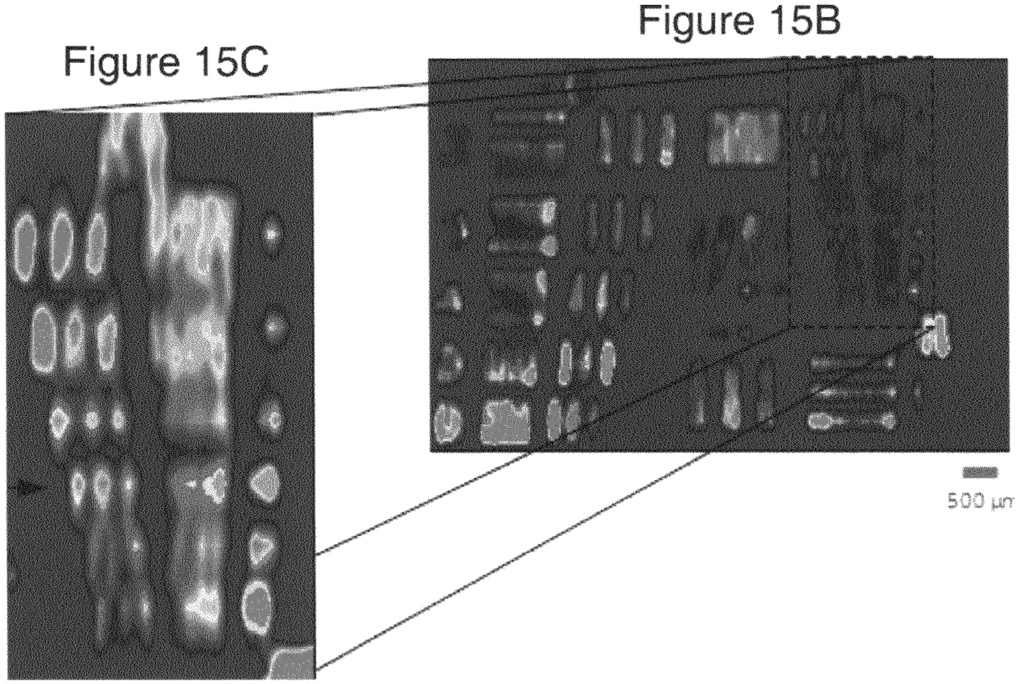

LASER ABLATION FLOWING ATMOSPHERIC-PRESSURE AFTERGLOW FOR AMBIENT MASS SPECTROMETRY

CROSS REFERENCE TO RELATED APPLICATION

This application claims priority under 35 U.S.C. §119(e) to U.S. Provisional Application Ser. No. 61/049,595, filed May 1, 2008, which is expressly incorporated by reference herein.

TECHNICAL FIELD

This disclosure relates to an apparatus for performing mass spectrometry, and a method of analyzing a sample through mass spectrometry. In particular, the disclosure relates to an apparatus capable of ambient mass spectrometry and mass spectral imaging by coupling laser ablation, flowing atmospheric-pressure afterglow ionization, and mass spectrometry.

BACKGROUND

Mass spectral imaging (MSI) has become an important analytical technique that has been broadly utilized within a number of fields. Its utilization is prominent in materials analysis and it has been utilized for diverse applications from metals characterization to biochemistry. It has been growing in importance, especially for the analysis of tissues and other biological samples. By generating an analyte map of a surface, valuable information about how a certain organism uses a given analyte can be obtained. Conventionally, MSI is performed with an ionization source that is under vacuum, such as matrix-assisted laser desorption/ionization (MALDI) or secondary ion mass spectrometry (SIMS). McDonnell, L. A. Heeren, R. M. *Mass Spectrom. Rev.* 2007, 26, 606-643. To date, two methods for performing MSI with MALDI have been demonstrated. The most common technique, termed MALDI probe imaging, scans a pulsed UV laser across a sample surface that is evenly coated with a UV-absorbing matrix. Caprioli, R. M.; Farmer, T. B.; Gile, *J. Anal. Chem.* 1997, 69, 4751-4760. The resulting time-trace can be converted into a distance plot and the chemical image can be compiled. An alternative method, termed MALDI microscope imaging, pulses a defocused UV laser spot onto a matrix-covered sample to envelop a large area. Luxembourg, S. L.; Mize, T. H.; McDonnell, L. A.; Heeren, R. M. A. *Anal. Chem.* 2004, 76, 5339-5344. Special ion optics preserve and magnify the shape of the resulting ion packet. The ions are then detected with an intensified charged coupled device (iCCD) after traveling through a conventional time-of-flight (TOF) mass analyzer for mass-to-charge (m/z) separation. This technique may require specialized ion optics, fast electronics/detectors, and complex computing to regenerate chemical images. Correspondingly, it may be seen that few m/z (mass-to-charge ratio) values can be detected with each run due to the detector response time and the size of the data files generated. Klinkert, I.; McDonnell, L. A.; Luxembourg, S. L.; Altelaar, A. F. M.; Amstalden, E. R.; Piersma, S. R.; Heeren, R. M. A. Rev. *Sci. Instrum.* 2007, 78. There are numerous other potential challenges in using MALDI for MSI. One potential challenge is that samples are analyzed under vacuum, potentially presenting the additional steps of drying and mounting a biological, or wet, sample prior to analysis. Another potential challenge is that the matrix solution must be applied to the sample evenly and in small enough droplets to obtain high spatial resolution while maintaining an optimal matrix to analyte ratio.

A class of atmospheric-pressure ionization sources for mass spectrometry, collectively termed ambient mass spectrometry (AMS), have been developed and shown to be well suited for MSI. One example of sampling at atmospheric-pressure includes a recently developed infrared MALDI (AP-IR-MALDI) for MSI. Li, Y.; Shrestha, B.; Vertes, A. *Anal. Chem.* 2007, 79, 523-532. In this case, an IR laser tuned to a vibrational band of water was used for the desorption/ionization process, so that water would act as the matrix. A potential limitation of the AP-IR-MALDI technique was the diffraction limit of the laser (~250 micrometer (μm)). While the technique did result in chemical images, challenges persist in obtaining improved signal-to-noise ratios.

Another method for MSI of an atmospheric-pressure sample is the use of desorption electrospray ionization (DESI). Wiseman, J. M.; Ifa, D. R.; Song, Q. Y.; Cooks, R. G. *Angewandte Chemie-International Edition* 2006, 45, 7188-7192. DESI uses a high velocity gas stream to impact solvent droplets from an electrospray ionization (ESI) source onto a surface. Takats, Z.; Wiseman, J. M.; Gologan, B.; Cooks, R. G. *Science* (*Washington, D.C., United States*) 2004, 306, 471-473. When the large solvent droplets impact the sample surface, they break up into smaller droplets and pick up analyte molecules from the surface. The smaller droplets, which have a scatter angle of ~10°, are drawn into the capillary interface of a mass spectrometer. Cooks, R. G.; Ouyang, Z.; Takats, Z.; Wiseman, J. M. *Science* 2006, 311, 1566-1570. Costa, A. B.; Cooks, R. G. *Chemical Communications* 2007, 3915-3917. Takats, Z.; Wiseman, J. M.; Cooks, R. G. *Journal of Mass Spectrometry* 2005, 40, 1261-1275. Venter, A.; Sojka, P. E.; Cooks, R. G. *Anal. Chem.* 2006, ACS ASAP. As the analyte-containing solvent droplets evaporate, the charge originally on the droplet is transferred to the analyte molecule. To perform MSI, the sample stage is scanned underneath the fixed-position DESI tip and mass spectrometer capillary interface. Spatial resolutions may be limited by droplet scatter, sample smearing, and DESI tip diameter (~200 micrometer (μm)). Ifa, D. R.; Gumaelius, L. M.; Eberlin, L. S.; Manicke, N. E.; Cooks, R. G. *Analyst* 2007, 132, 461-467. Both of these techniques have the advantage that high-mass molecules can be detected; however the spatial resolution is still an aspect which could be improved.

Another technique, termed laser ablation electrospray ionization (LAESI), requires no sample pretreatment, can operate at atmospheric-pressure, and offers the potential of depth information. In this technique, laser ablation using a mid-IR laser removes material from a surface and ESI is used to directly ionize molecules from the ablation plume. By coupling laser ablation with ESI, good detection limits have been achieved, 5 fmol for verapamil, while maintaining a broad detectable mass range (up to 66 kDa). Nemes, P.; Vertes, A. *Anal. Chem.* 2007, 79, 8098-8106.

SUMMARY OF THE DISCLOSURE

An apparatus for mass spectrometry and mass spectral imaging and a method for analyzing a sample with mass spectrometry and mass spectral imaging in accordance with the present disclosure comprises one or more of the following features or combinations thereof:

One aspect of the disclosure is an apparatus for mass spectrometry comprising a flowing atmospheric-pressure afterglow (FAPA) ion source, a laser ablation sampler, and a mass spectrometer. In one embodiment, the laser ablation sampler includes a laser and a laser ablation chamber configured such that the laser can irradiate a sample to form an ablated sample. The laser ablation sampler and the flowing atmospheric-pressure afterglow ion source are operably connected so that the ablated sample material (referred to herein as ablated sample) can interact with a reactive species generated by the flowing atmospheric-pressure afterglow ion source, thereby desorbing and ionizing atoms or molecules of the ablated sample to form an ion population having a mass-to-charge ratio distribution. The mass spectrometer is operably connected to the laser ablation sampler and the flowing atmospheric-pressure afterglow ion source so that the ion population is transmitted to the mass spectrometer, wherein the mass spectrometer separates the ion population according to the mass-to-charge ratio distribution.

In illustrative embodiments, the laser ablation sampler is connected to the flowing atmospheric-pressure afterglow ion source by a section of tubing. In one embodiment, the laser is a UV laser operating in a pulsed mode. In another embodiment, the laser ablation sampler further comprises an irradiation location modification mechanism, wherein the irradiation location modification mechanism in a first position is configured to irradiate a first location on the sample and the irradiation location modification mechanism in a second position is configured to irradiate a second location on the sample. In yet another embodiment, the laser ablation sampler further includes an inlet and an outlet, wherein a flow of gas can be applied to the inlet, the flow of gas propagating through the laser ablation chamber to the outlet and then to the flowing atmospheric-pressure afterglow ion source. In one embodiment, the flowing atmospheric-pressure afterglow ion source is operated at a set voltage, wherein the set voltage is about 300 Volts. In another embodiment, the mass spectrometer is a time-of-flight mass spectrometer.

In illustrative embodiments, a method for analyzing a sample includes steps of ablating the sample with a laser to form aerosolized nanoparticles, desorbing and ionizing species from the aerosolized nanoparticles with a reactive effluent gas generated by a flowing atmospheric-pressure afterglow ion source to form an ionized species, and introducing the ionized species into a mass spectrometer, wherein the ionized species have a mass-to-charge ratio distribution, and separating the ionized species by the mass-to-charge ratio distribution. In one embodiment, the desorbing and ionizing molecules do not result in extensive fragmentation. In another embodiment, ablating the sample includes subjecting a first sample location to a first radiation level such that a first volume of the sample is removed. In yet another embodiment, the first volume of the sample removed is between about 0.001 to about 1000 nanoliters. In another embodiment, the first volume of the sample removed is between about 0.01 to about 100 nanoliters.

In illustrative embodiments, a method for analyzing a sample includes an ablating step at a radiation level which does not cause significant photo-bleaching. The radiation level is within a range of radiation levels that do not cause significant photo-bleaching. In one embodiment, over the range of radiation levels used in the ablating step, the level of photo-bleaching is independent from the laser power. In one embodiment, the volume of sample which is ablated increases with the increasing laser power. In another embodiment, ablating the sample with the first radiation level causes a first photo-bleaching level, ablating the sample with a second radiation level causes a second photo-bleaching level and a second volume of the sample removed, the first photo-bleaching level is substantially equivalent to the second photo-bleaching level, and a positive correlation exists between a first ratio of the first radiation level to the second radiation level and a second ratio of the first volume of the sample removed to the second volume of the sample removed. In one embodiment, ablating the sample includes changing, in a predetermined manner and after a predetermined time, the first sample location to a second sample location.

In illustrative embodiments, a method for analyzing a sample also includes obtaining the mass-to-charge ratio distribution within the predetermined time to obtain a mass-to-charge ratio distribution time-trace, converting the mass-to-charge ratio distribution time-trace into a mass-to-charge ratio distribution distance-trace, and compiling the mass-to-charge ratio distribution distance-trace into one or more chemical images depicting a concentration of a given atomic or molecular species for a given volume of the sample. In one embodiment, a method for analyzing a sample also includes ablating a second volume of the sample at a second predetermined time in the first sample location. In one embodiment, a method for analyzing a sample also includes collecting the mass-to-charge ratio distribution at the second predetermined time to obtain a mass-to-charge ratio distribution time-trace, converting the mass-to-charge ratio distribution time-trace into a mass-to-charge ratio distribution depth-trace, compiling the mass-to-charge ratio distribution depth-trace into one or more chemical images depicting a concentration of a given atomic or molecular species for a given volume of the sample. In one embodiment, desorbing and ionizing includes the reactive effluent gas selected from a group consisting of $N_2^+$, $([H_2O]_nH^+)$, $NO^+$, $O_2^+$, and $Ar^+$.

In illustrative embodiments, an analytical einstrument for characterization of a sample includes a mass spectrometer, a flowing atmospheric-pressure afterglow ion source, a laser, and chamber. The analytical instrument is configured such that the mass spectrometer receives a population of ions desorbed and ionized upon interaction of an ablated sample with a reactive species population, the reactive species population being formed by the flowing atmospheric-pressure afterglow ion source and the ablated sample being formed by the laser irradiating the sample which is mounted within the chamber. In one embodiment, the flowing atmospheric-pressure afterglow ion source includes a first electrode, a second electrode, at least one power supply, a carrier gas supply, a carrier gas inlet, and an afterglow outlet. The first electrode is spaced apart from the second electrode and the at least one power supply is configured to energize the first electrode and the second electrode to form a glow discharge between the first electrode and the second electrode. The carrier gas inlet introduces the carrier gas supply into the glow discharge such that the reactive species population is formed and carried to the afterglow outlet.

In illustrative embodiments, the analytical instrument includes a chamber having an afterglow inlet, an ion outlet, and a sample holder. In one embodiment, the afterglow inlet is configured to deliver the population of reactive species from the flowing atmospheric-pressure afterglow ion source to the chamber and interact with at least a portion of the ablated sample. In another embodiment, the ion outlet is configured to selectively transmit the population of ions using a combination of ion optics and gas flow controls. In another embodiment, the sample holder is movable. In yet another embodiment, the sample holder is configured so that it can change a location on the sample irradiated by the laser. In one embodiment, the sample holder is movable in three dimensions. For example, the sample holder may be a microscope stage, such as an inverted microscope stage. In one embodiment, the mass spectrometer is a time-of-flight mass spectrometer and the laser is a pulsed UV laser.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The patent or application file contains at least one drawing executed in color. Copies of this patent or patent application publication with color drawings will be provided by the office upon request and payment of the necessary fee.

FIG. 15(A-C) are images of (A) a 1951 USAF resolution target, (B) a mass spectral image of the resolution target which had been printed with a caffeine doped ink, and (C) an enlarged section of the mass spectral image showing the limit of resolution.

DETAILED DESCRIPTION

While the invention is susceptible to various modifications and alternative forms, specific embodiments will herein be described in detail. It should be understood, however, that there is no intent to limit the invention to the particular forms described, but on the contrary, the intention is to cover all modifications, equivalents, and alternatives falling within the spirit and scope of the invention.

References in the specification to "one embodiment", "an embodiment", "an illustrative embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
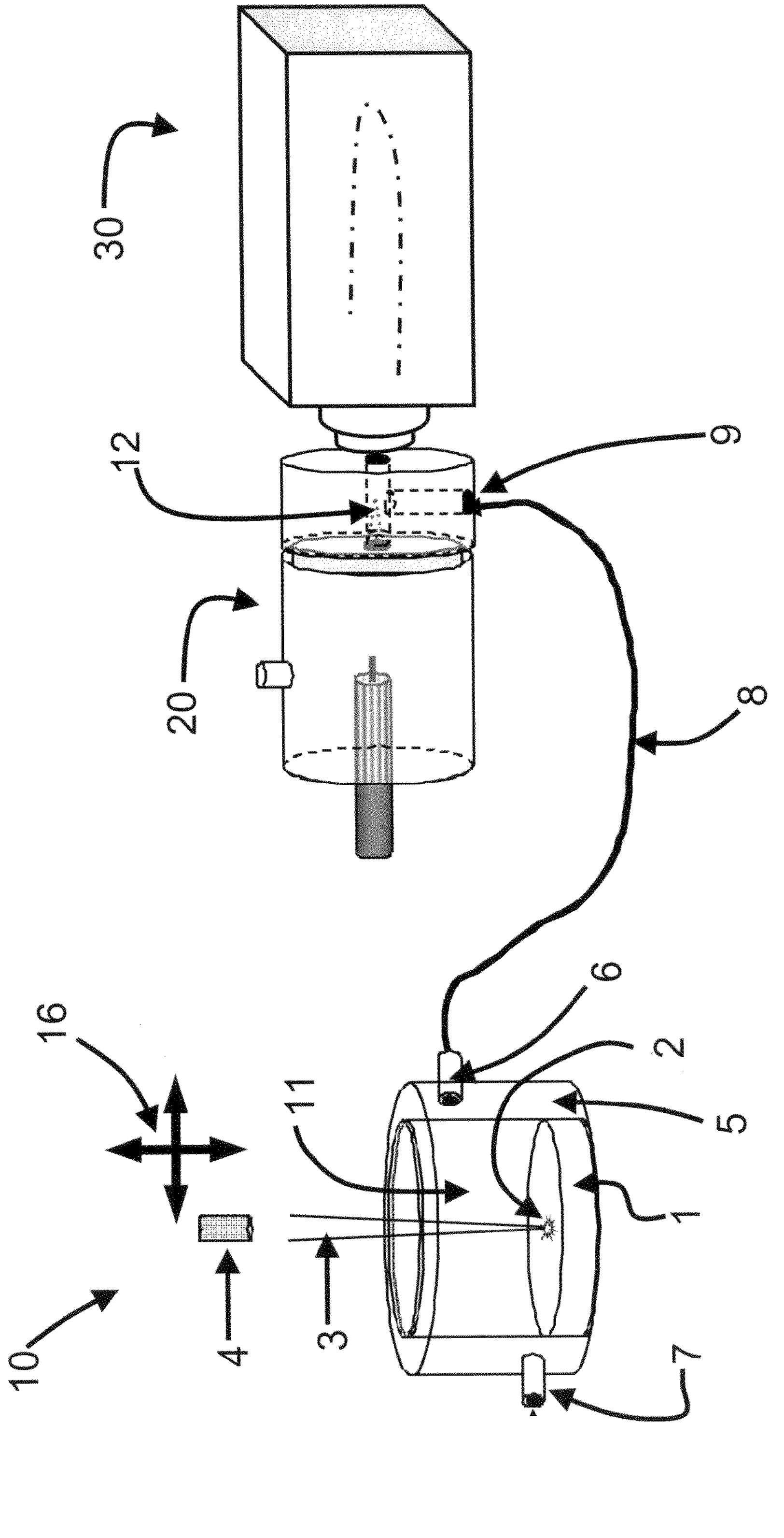
FIG. 1 is a scheme showing the laser ablation flowing atmospheric-pressure afterglow mass spectrometry apparatus.

Referring now to FIG. 1, a schematic view of an embodiment of an apparatus for mass spectrometry configured for analyzing a sample 1 is shown. The apparatus for mass spectrometry includes a FAPA ion source 20, a laser ablation sampler 10, and a mass spectrometer 30. In one embodiment, the laser ablation sampler 10 includes a laser 4 and an ablation chamber 5 configured such that the laser 4 can irradiate with beam 3 a sample 1 to form an ablated sample 2. The laser 4 generates a beam 3, which can be focused on a sample 1 to generate an ablated sample 2. As used herein, laser ablation is a process in which material is removed from a solid or liquid sample 1 through irradiating the sample 1 with a laser 4.

Various lasers are well-known in the art for use in laser ablation. Reference is made to Miller J. C., Haglund R. F. *Laser ablation and desorption*, Academic Press, 1998, which is hereby incorporated by reference herein, for disclosure related to laser ablation. One of ordinary skill in the art will appreciate that many equivalents of a laser 4 may be utilized without deviating from the scope of the present disclosure. In one embodiment, the laser 4 may emit radiation at any wavelength in the visible or infra red wavelength spectra. In another embodiment, the laser 4 may be a UV laser with a wavelength of less than 400 nm. In another embodiment the laser 4 can be focused or defocused such that spot size is from about <1 micrometer (μm) to about 1000 micrometers (μm) in diameter. In yet another embodiment, a Nd:YAG laser ablation sampler (LSX-200, CETAC, Inc., Omaha, Nebr.) could be used to ablate material from selected points on the sample 1 by employing 266 nm radiation focused to spot sizes between 10 micrometers (μm) and 300 micrometers (μm) in diameter. It will be appreciated by one of ordinary skill in the art that the laser 4 may be run in continuous or pulsed modes.

In one embodiment, the laser 4 is operated at about 20 Hz in a pulsed mode. It will also be recognized by one of ordinary skill in the art that the laser 4 may remove a finite, reproducible, and quantifiable amount of the sample 1 in a given amount of time. In one embodiment, the laser 4 is run in pulsed mode in a manner such that each pulse corresponds to a quantifiable amount of sample 1 being ablated. In this manner, one of ordinary skill in the art would recognize that the amount of sample 1 being ablated by the laser corresponds to the quantity of ablated sample 2 that is generated. The quantity of ablated sample 2 may be referred to by the volume of the depression left in the sample 1 after ablation in units of nanoliters.

In one aspect, the extent to which the beam 3 is focused affects the analysis. For example, a tightly focused beam 3 irradiates a very small area of sample 1 so the density of energy on that small area may be very high. A high energy density on a small area tends to ablate the sample 1 in such a manner that the ablation results in the formation of a pit or depression in the sample 1. In one embodiment, successive pulses in the sample location deepen the depression. In one embodiment, successive pulses may be used to produce a depth profile of the sample 1. In another example, the beam 3 may be defocused, thus, the area of sample irradiated is greater than in the focused mode and the density of energy deposition is lower. In this embodiment, the resulting depression may be shallower and covers a larger area. Therefore, the two approaches, using focused or defocused beams, may have different analytical applications. In yet another example, the laser beam 3 can be moved across the sample 1 in a spatial pattern that enables representative sampling of an extended region of the surface of sample 1. Factors which may be used in selecting a laser include laser power, pulsed or continuous laser operation, pulse repetition rate, focused or defocused laser modes, depth or surface profiling, and the absorption characteristics of the sample range. One aspect of the present disclosure is that the use of focused beams enables MSI with high spatial resolution.

In one aspect, the number of aerosolized nanoparticles may be dependent upon the laser power setting and the laser power setting may be substantially independent from the extent of sample photo-bleaching. Surprisingly, the laser power setting can be increased while the extent of photo-bleaching remains low. This is one advantage because greater amounts of the sample 1 can be ablated without causing photo-bleaching of the sample 1. Photo-bleaching by the laser irradiation, in this context, may degrade the quality of a mass spectrum subsequently obtained as photo-bleaching is indicative of molecular degradation or fragmentation.

In another aspect, the laser 4 may be capable of ablating the sample 1 with spot sizes of less than about 1 micrometer (μm) and the laser 4 may be capable of ablating samples with spot depths of less than about 50 nanometers. Previously, the flowing atmospheric-pressure afterglow may have been limited to situations where poor spatial resolution was acceptable. The efficient ionization and desorption of the FAPA ion source 20 of the ablated samples provides very high sensitivity which permits very small ablated samples to be analyzed, thus improving the attainable spatial resolution.

While not being limited to a particular theory, a sample 1 subjected to a laser 4 will be heated rapidly to high temperatures (temperature is dependent on the wavelength, material, and flux) and will vaporize as a mixture of gas, molten droplets, and small particulate matter. This mixture has been referred to herein as aerosolized nanoparticles or ablated sample 2. In one embodiment, a small imaging device, such as a camera, may be incorporated into the ablation chamber 5 to view the sample 1 and so that the beam 3 can be directed onto a particular location on the sample 1. In one embodiment, the laser ablation may be done with an energy density such that the ablated sample 2 is not atomized. While atomization may be accomplished in an embodiment of the present disclosure, a separate embodiment utilizes laser energy densities such that the ablated sample 2 forms aerosolized nanoparticles without being atomized, thereby allowing molecular mass spectra to be obtained.

An ablated sample 2 is typically comprised of aerosolized nanoparticles with a composition that is representative of the material upon which the beam 3 is incident, as depicted in FIG. 1, the sample 1. The ablated sample 2 can take many different forms and compositions as the characteristics of the ablated sample 2 will depend upon the nature, properties and identity of the sample 1. Furthermore, the conditions of the ablation chamber may contribute to the ablated sample's characteristics, for instance, the temperature, pressure, humidity, and the other factors which relate to the characteristics of the air surrounding the sample 1 at the time the ablation occurs. In one embodiment, ambient conditions are present in the air surrounding the sample 1.

Ambient conditions include atmospheric-pressure, room temperature, and a typical level of humidity. Within the scope of ambient conditions are those conditions which would be considered normal for everyday living. However, conditions of the air surrounding the sample 1 at the time of ablation may be modified and still fall within the scope of the present disclosure. For example, concentrated purified gases could be used to saturate the area surrounding the sample 1 at the time of ablation. In one embodiment of the present disclosure, nitrogen gas may be used. For example, nitrogen gas may be used to surround the sample 1 at the time of ablation. The nitrogen gas may be used to fill the void space 11. As used herein, the term void space includes that space within ablation chamber not filled by either the sample 1, or the any sample holders. Void space 11 is not intended to imply that such space is free of gases or free of ablated sample 2. In the contrary, void space 11 may be filled with any gas well known in the art appropriate for laser ablation. The ablated sample 2, which otherwise may be referred to as aerosolized nanoparticles, may be carried by a stream of helium, argon, or nitrogen gas. The term ambient may still be used to describe these conditions because the temperature and pressure within the ablation chamber 5 remains like those considered normal for everyday living.

The laser ablation sampler 10 and the FAPA ion source 20 are operably connected so that the ablated sample 2 can interact with a reactive species generated by the FAPA ion source 20, thereby desorbing and ionizing atoms or molecules of the ablated sample 2 to form an ion population having a mass-to-charge ratio distribution. The mass spectrometer 30 is operably connected to the laser ablation sampler 10 and the FAPA ion source 20 so that the ion population is transmitted to the mass spectrometer 30, wherein the mass spectrometer 30 separates the ion population according to the mass-to-charge ratio distribution.

In illustrative embodiments, the laser ablation sampler 10 is connected to the FAPA ion source 20 by a section of tubing 8. In yet another embodiment, the laser ablation sampler further includes an ablation chamber inlet 7 and an ablation chamber outlet 6, wherein a flow of gas can be applied to the ablation chamber inlet 7, the flow of gas propagating through the ablation chamber 5 to the laser ablation outlet 6 and then to the FAPA ion source 20. In one embodiment, the FAPA ion source 20 is operated at a set voltage, wherein the set voltage is about 300 Volts. In another embodiment, the mass spectrometer 30 is a time-of-flight mass spectrometer.

Referring again to FIG. 1, nitrogen gas or another gas suitable for laser ablation procedures enters the laser ablation sampler 10 at the ablation chamber inlet 7, flows by the sample 1 and carries the ablated sample 2 out of the laser ablation sampler 10 through the a ablation chamber outlet 6. In one embodiment, the nitrogen gas may flow through the ablation chamber 5 at about 0.3 L/min, flowing from the ablation chamber inlet 7 to the ablation chamber outlet 6. The nitrogen gas could then flow through a section of tubing 8 to a flowing atmospheric-pressure afterglow sample inlet 9 into the flowing atmospheric-pressure afterglow (FAPA) ion source 20. For example, the section of tubing 8 may be a to a 1 m section of PTFE tubing. In another example, the section of tubing 8 may be a 1 m section of Teflon® tubing. It will be appreciated by one of ordinary skill in the art that the geometry and physical dimensions of the laser ablation sampler 10 could include a great number of equivalents without significantly deviating from the functional characteristics of the laser ablation sampler 10 described herein.

In one embodiment, a laser ablation sampler 10 with a small void space 11 may be used to reduce the time that the ablated sample 2 remains in the laser ablation sampler 10. Similarly, the laser ablation sampler 10 may not necessarily be comprised of an ablation chamber 5 with a discrete volume. In one embodiment, the laser 4 and the beam 3 are incident upon objects that are not contained in any sense, but rather moving or passing through an area in which the beam 3 is located. Furthermore, the ablation chamber inlet 7 is not necessary; the ablated sample 2 could be moved by other means besides a flowing gas into a location where it can interact with the FAPA ion source 20. For example, diffusion could be relied upon to move the ablated sample 2 into the FAPA ablated sample inlet 9.

The efficiency of transport of the ablated sample 2 into the afterglow region of the FAPA ion source 20 may be greater than about 50% by weight. In one embodiment, the efficiency of transport of the ablated sample 2 into the afterglow region of the FAPA may be greater than about 10% by weight. In another embodiment, the efficiency of transport of the ablated sample 2 into the afterglow region of the FAPA may be greater than about 90% by weight. The efficiency of transport can be affected by altering many of the operating parameters of the instrument. For example, the efficiency of transport is increased by decreasing the length of the section of tubing 8 connecting the laser ablation sampler to the FAPA ion source 20. Furthermore, the rate of gas flow through the ablation chamber 5, the void space 11 volume and operating parameters of the laser 4 can all vary the efficiency of transport.

One aspect of the disclosure is that the laser 4 is capable of rastering across a sample 1. The term rastering means that the spatial relationship between the beam 3 and the sample 1 is changed. One of ordinary skill in the art will appreciate that this change may be effectuated by moving the sample 1, laser 4, or beam 3. The location of the beam 3 on the sample 1 may be moved in a manner so that the mass spectrometer 30 reports data to a data processor in the form of a time trace, the data processor converts the resulting time trace into a distance plot, and the data processor compiles the distance plot into a chemical image containing molecular information regarding the sample. The image may contain molecular information regarding the presence, concentration, and identity of the molecules within the sample. In this manner, one of ordinary skill in the art would appreciate a two dimensional chemical image mapping the concentration and the identity of molecules on the surface of a sample.

Arrows 16 signify that the laser 4 may be moved with respect to the sample 1. In one embodiment, the laser 4 may be moved. In another embodiment, the ablation chamber 5 may be moved in relation to the laser 4. In one embodiment, the laser 4 or the ablation chamber 5 may be moved both laterally and vertically; the movement can occur in three dimensions.

Another aspect of the present disclosure is that the laser 4 is capable of probing the depth of a sample 1. The term probing the depth of a sample 1 means that the laser 4 can be operated in a manner so that the beam 3 interacts with the sample 1 in the same lateral location multiple times or for an extended time, thereby removing the surface of the sample 1 and ablating sample from depths greater than the surface. By extended times or multiple times, it is meant that the laser 4 interacts with the sample 1 in a manner so that the sample 1 is ablated to a degree such that portions of the sample 1 which are below the surface of the sample are being ablated. In this manner, a depression in the sample is caused by the laser ablation. Within the depression, the interaction of the beam 3 with the sample 1 provides ablated sample 2 that was not on the surface. The depth of the depression will increase upon extended or multiple exposures of the sample 1 to the beam 3 in one location. As the depth is increased, the ablated sample 2 is from a location deeper within the sample 1. In one embodiment, the sample 1 is purposefully probed at depth so that the mass spectral data acquired can be correlated to a specific depth within the sample 1. In one embodiment of the present disclosure, this data may be processed such that an image showing the mass spectral profile of the depth of the sample 1 may be created. In this manner, an image of the molecular profile of a sample's 1 depth could be made. In a further embodiment, the combination of rastering and depth profiling would enable a 3-dimensional chemical image of a sample 1 to be generated.

Referring again to FIG. 1, an analytical instrument for characterization of a sample includes a mass spectrometer 30, a FAPA ion source 20, and a laser ablation sampler 10. The analytical instrument is configured such that the mass spectrometer 30 receives a population of ions desorbed and ionized upon interaction of an ablated sample 2 with a reactive species population, the reactive species population being formed by the FAPA ion source 20 and the ablated sample being formed by the laser 4 irradiating the sample 1 which is mounted within the ablation chamber 5. In one embodiment, the FAPA ion source 20 includes a first electrode, a second electrode, at least one power supply, a carrier gas supply, a carrier gas inlet, and an afterglow outlet. The first electrode is spaced apart from the second electrode and the at least one power supply is configured to energize the first electrode and the second electrode to form a glow discharge between the first electrode and the second electrode. The carrier gas inlet introduces the carrier gas supply to the glow discharge such that the reactive species population is formed and carried to the afterglow outlet, where a afterglow ionization region 12 is formed. Reference is made to U.S. application Ser. No. 11/980,843, which is hereby incorporated by reference in its entirety for disclosure relating to the FAPA ion source 20 and its connection to a mass spectrometer 30.

It is surprising and unexpected the many advantages that are achieved in operably connecting a laser ablation sampler 10, a FAPA ion source 20 and a mass spectrometer 30. In one aspect, the ablated sample 2 may consist of aerosolized nanoparticles and the FAPA ion source 20 may interact with the aerosolized nanoparticles causing ionized molecules to desorb from the aerosolized nanoparticles. The aerosolized nanoparticles generated by laser ablation are useful for ionization and desorption in the FAPA ion source 20 and subsequent mass analysis by the mass spectrometer 30 results in unexpectedly good results. While not limited to this theory, it is understood that the ablated sample 2 consisting of the aerosolized nanoparticles has a very high surface to mass ratio and that this very high surface area enhances interaction between the ablated sample 2 and FAPA ion source 20. In this respect, the ablated sample 2 can have molecules readily desorbed and be very efficiently ionized, thus providing surprisingly good sensitivity in analysis.

In one embodiment, the FAPA ion source 20 is used under conditions in which it is a soft-ionizing source. While not being limited to a particular theory, the FAPA ion source 20 may be operated under conditions such as not to cause extensive fragmentation of molecules. Furthermore, the laser ablation sampler may be run with conditions to prevent atomization of the sample, thus, a molecular profile of a sample 1 with little fragmentation may be obtained. The laser ablation sampler 10 and the FAPA ion source 20 were discovered to be well-suited for operation in atmospheric-pressure. In one embodiment, the percentage of fragmentation, as defined as the combined weight percentage of fragmented ion peaks compared to the parent molecules weight, is less than 5%. In another embodiment, the percentage of fragmentation is less than 25%. In other embodiments, fragmentation can be purposefully obtained and the molecular sample may be reduced entirely to a population of various fragments. Flowing atmospheric-pressure afterglow ionization at atmospheric-pressure is able to prevent fragmentation because the molecules are capable of undergoing vibrational relaxation at atmospheric-pressure, which would lead to fragmentation in a vacuum.

Figure 2:
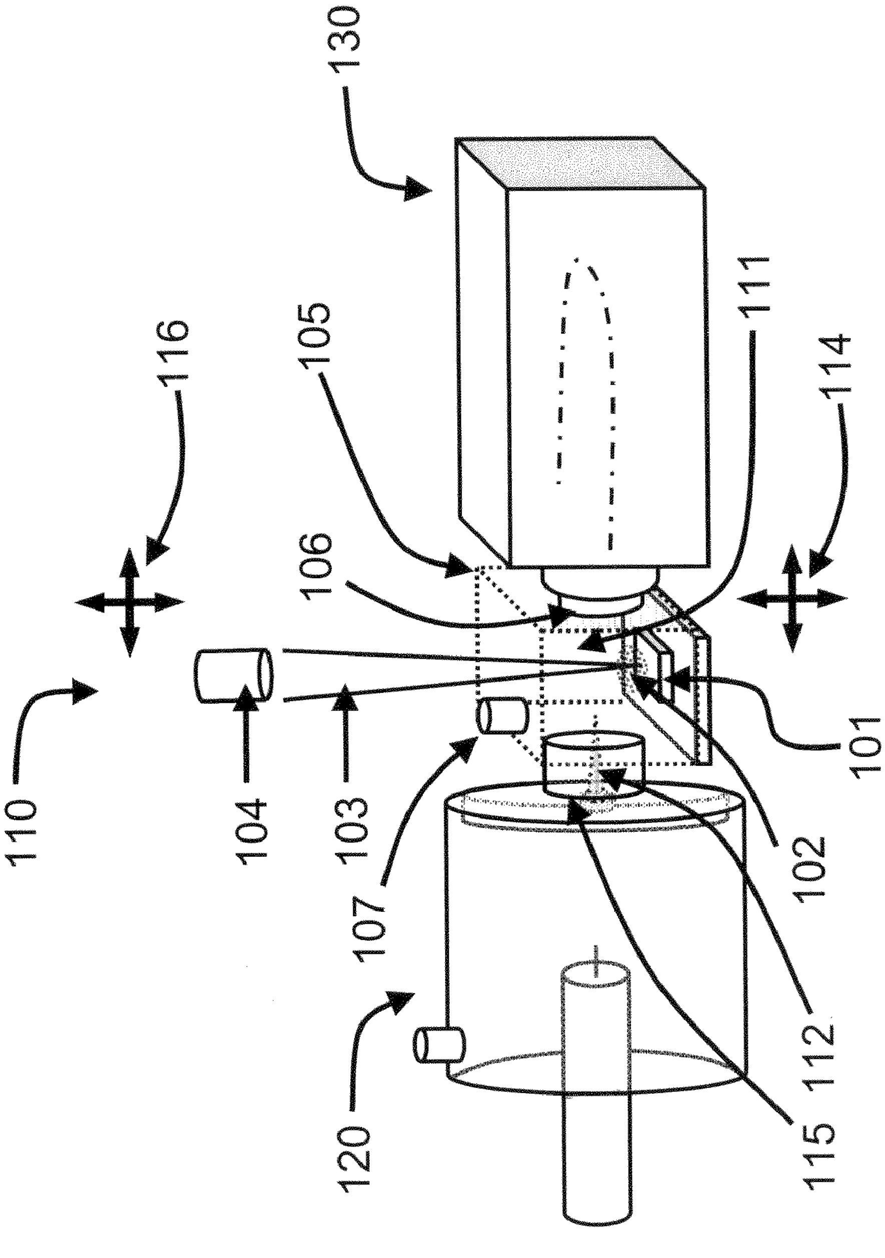
FIG. 2 is a scheme showing an alternative embodiment of the laser ablation flowing atmospheric-pressure afterglow mass spectrometry apparatus.

Referring now to FIG. 2, a diagrammatic view of an alternative embodiment of an apparatus configured for analyzing a sample 1 is shown. The apparatus includes a laser ablation sampler 110. The laser ablation sampler 110 is comprised of a laser 104, an ablation chamber 105, an ablation chamber inlet 107, and an outlet 106. The laser 104 generates a beam 103, which can be focused on a sample 101 to generate an ablated sample 102. In one embodiment, the laser ablation sampler 110 and the FAPA ion source 120 may be configured such that the ablation and the ionization and desorption from the ablated sample 102 occurs within the same cell, the ablation chamber 105. The outlet 106 of the ablation chamber 105 may be directly coupled to the mass spectrometer 130. The afterglow ionization region 112 of the FAPA ion source 120 may extend into the ablation chamber 105 through an afterglow inlet 115. The void space 111 may be modified to achieve the desired performance. For example, the void space 111 may be reduced to improve efficiency with respect to the desorbing and ionizing the ablated sample 102. The void space 111 may be increased in those applications in which a large depth profile of the sample 101 is being probed and consequently high volumes of sample 101 are being removed through ablation. In one embodiment, the ablation chamber 105 or a sample holder there within are movable as represented by directional arrows 114.

The present disclosure further relates to a method for analyzing a sample including the steps of ablating the sample 1 with a laser 4 to form aerosolized nanoparticles, desorbing and ionizing species from the aerosolized nanoparticles with a reactive effluent gas generated by a FAPA ion source 20 to form an ionized species, and introducing the ionized species into a mass spectrometer 30, wherein the ionized species have a mass-to-charge ratio distribution, and separating the ionized species by the mass-to-charge ratio distribution. In one embodiment, the desorbing and ionizing molecules do not result in extensive fragmentation. In another embodiment, ablating the sample includes subjecting a first sample location to a first radiation level such that a first volume of the sample is removed. In yet another embodiment, the first volume of the sample removed is between about 0.001 to about 1000 nanoliters. In another embodiment, the first volume of the sample removed is between about 0.01 to about 100 nanoliters. In another embodiment, the first volume of the sample removed is between about 0.1 to about 10 nanoliters. In yet another embodiment, the first volume of the sample removed is about 1 nanoliter.

In illustrative embodiments, a method for analyzing a sample includes an ablating step at a radiation level which does not cause significant photo-bleaching. The radiation level is within a range of radiation levels that do not cause significant photo-bleaching. In one embodiment, over the range of radiation levels used in the ablating step, the level of photo-bleaching is independent from the laser power. For example, ablating the sample with the first radiation level causes a first photo-bleaching level, ablating the sample with a second radiation level causes a second photo-bleaching level and a second volume of the sample removed, the first photo-bleaching level is substantially equivalent to the second photo-bleaching level, and a positive correlation exists between a first ratio of the first radiation level to the second radiation level and a second ratio of the first volume of the sample removed to the second volume of the sample removed. In one embodiment, ablating the sample includes changing, in a predetermined manner and after a predetermined time, the first sample location to a second sample location.

In illustrative embodiments, a method for analyzing a sample also includes obtaining the mass-to-charge ratio distribution within the predetermined time to obtain a mass-to-charge ratio distribution time-trace, converting the mass-to-charge ratio distribution time-trace into a mass-to-charge ratio distribution distance-trace, and compiling the mass-to-charge ratio distribution distance-trace into one or more chemical images depicting a concentration of a given atomic or molecular species for a given volume of the sample. In one embodiment, a method for analyzing a sample also includes ablating a second volume of the sample at a second predetermined time in the first sample location. In one embodiment, a method for analyzing a sample also includes collecting the mass-to-charge ratio distribution at the second predetermined time to obtain a mass-to-charge ratio distribution time-trace, converting the mass-to-charge ratio distribution time-trace into a mass-to-charge ratio distribution depth-trace, compiling the mass-to-charge ratio distribution depth-trace into one or more chemical images depicting a concentration of a given atomic or molecular species for a given volume of the sample. In one embodiment, desorbing and ionizing includes the reactive effluent gas selected from a group consisting of $N_2^+$, $([H_2O]_nH^+)$, $NO^+$, $O_2^+$, and $Ar^+$.

Figure 3:
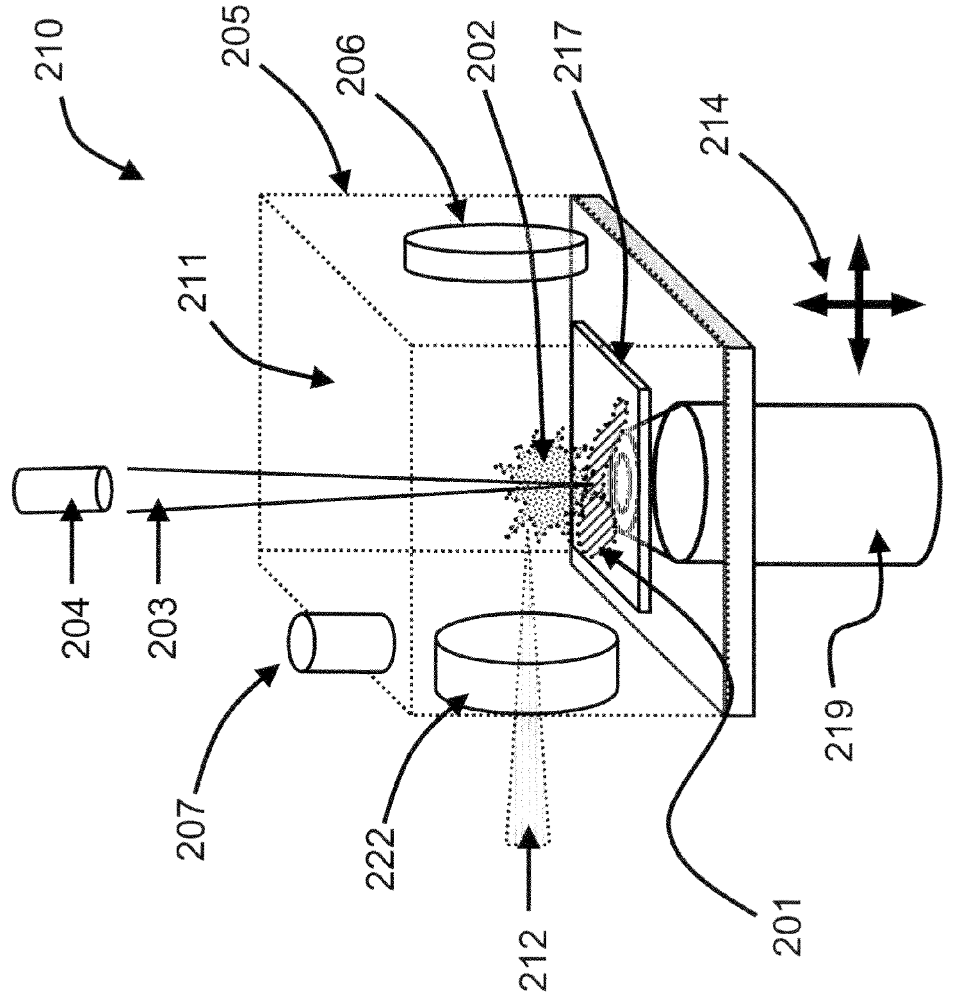
FIG. 3 is a scheme showing the laser ablation sampler in an embodiment in which the movable sample holder is an inverted microscope stage.

Referring now to FIG. 3, a diagrammatic view of an alternative embodiment of a laser ablation sampler 210 for analyzing a sample 201 is shown. The laser ablation sampler 210 is comprised of a laser 204, an ablation chamber 205, an ablation chamber inlet 207, an afterglow inlet 222, and an outlet 206. The laser 204 generates a beam 203, which can be focused on a sample 201 to generate an ablated sample 202. The outlet 206 of the ablation chamber 205 may be directly coupled to a mass spectrometer and the afterglow ionization region 212 of a FAPA ion source may extend into the laser ablation chamber 205 through a port 222. The void space 211 may be modified to achieve the desired performance. In one embodiment, the sample holder may be the stage 217 of a microscope. For example, the stage 217 may be the stage of an inverted microscope, wherein the microscope objective 219 could simultaneously image the sample 201 while the laser 204 was ablating the sample 201. The stage of the microscope is movable as represented by directional arrows 214.

Figure 4:
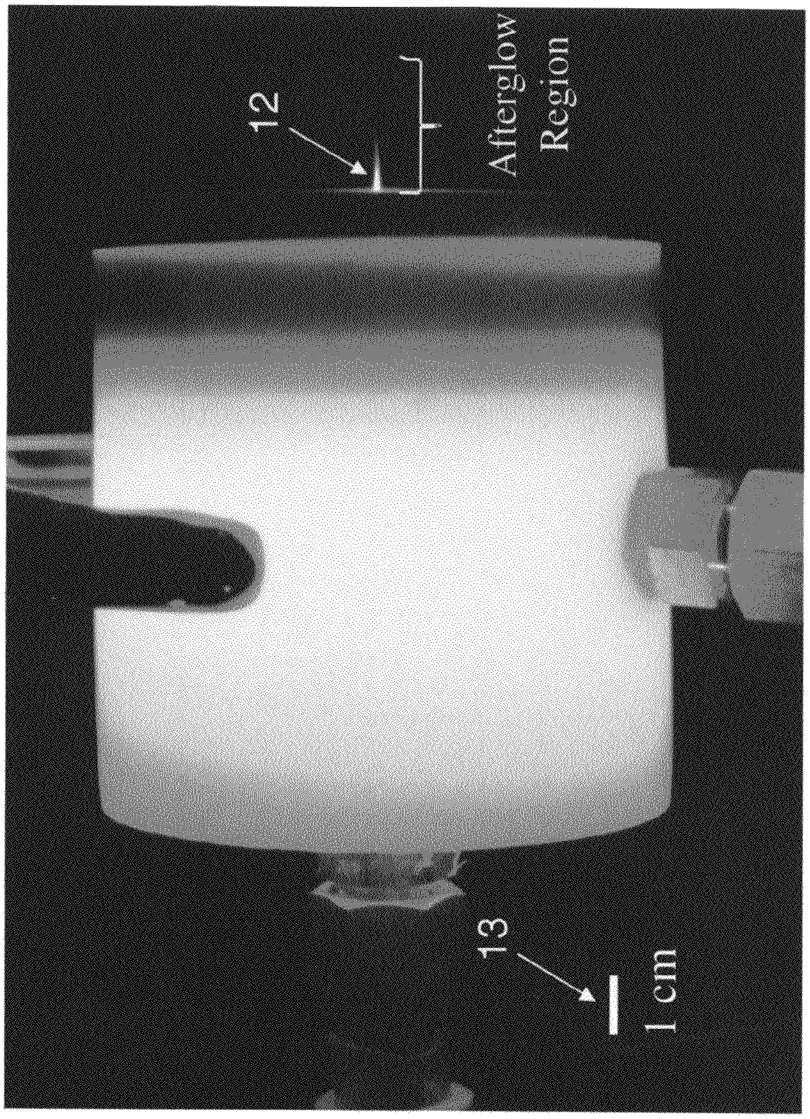
FIG. 4 is a photograph of a flowing atmospheric-pressure afterglow ion source with a neon discharge.
Figure 5:
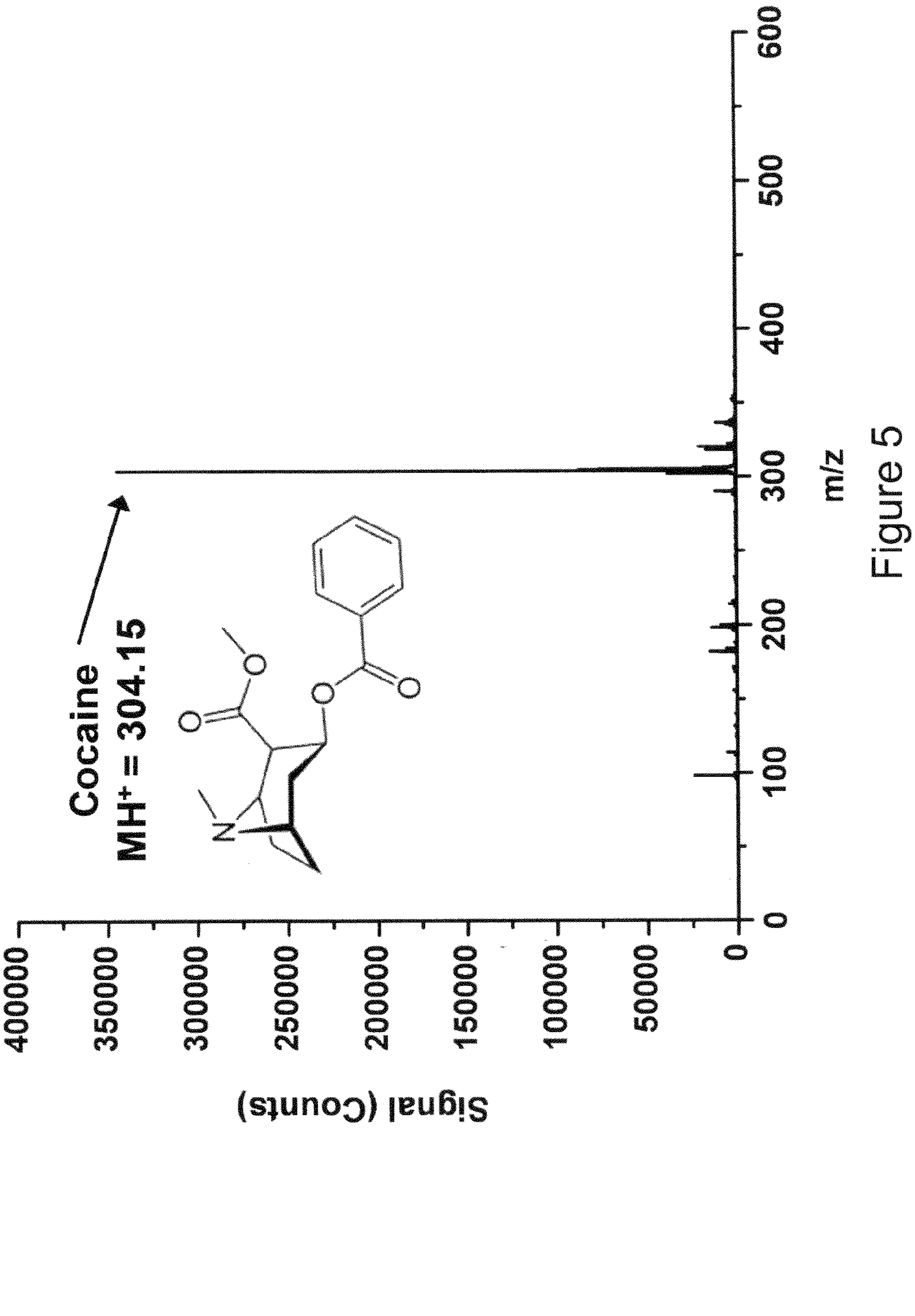
FIG. 5 shows a mass spectrum of a cocaine standard.
Figure 6:
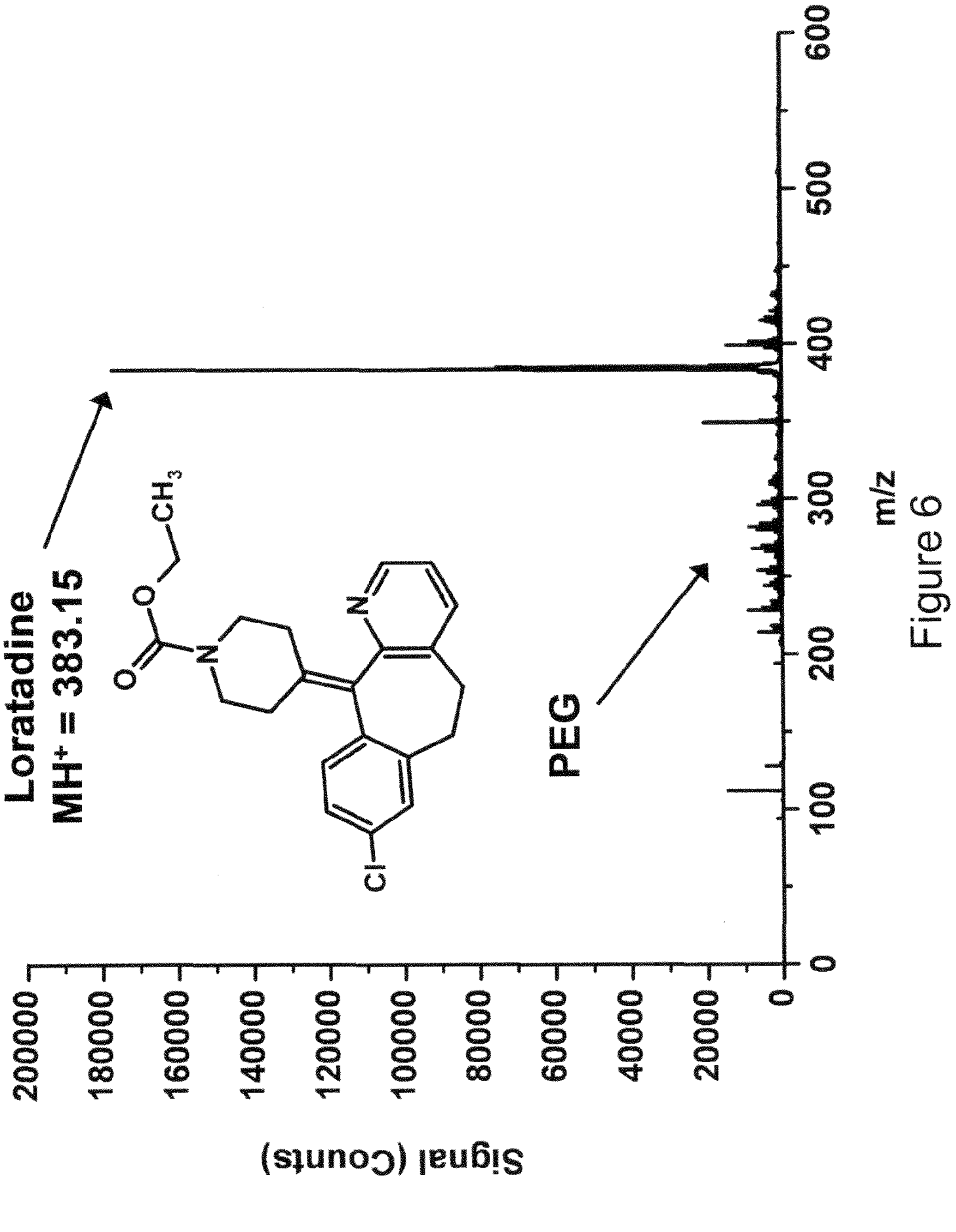
FIG. 6 shows a mass spectrum of a Claratin® tablet.
Figure 7:
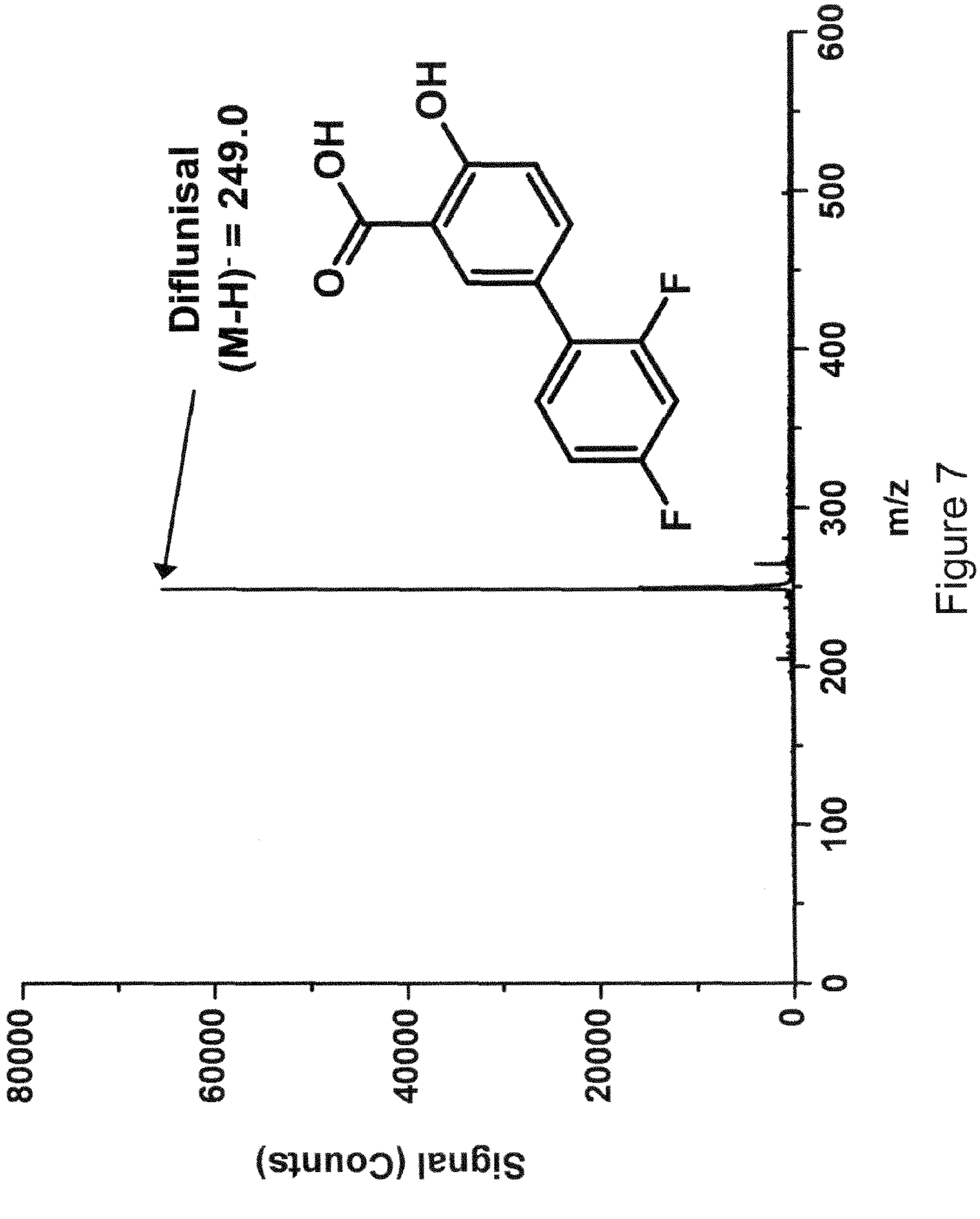
FIG. 7 shows a mass spectrum of a Diflunisal® tablet.

FIG. 4 is a photograph of a flowing atmospheric-pressure afterglow cell with a neon discharge for illustrating the location of the flowing atmospheric-pressure afterglow ionization region 12. The ablated sample 2 is made to enter the flowing atmospheric-pressure afterglow ionization region and becomes ionized. Previously, flowing atmospheric-pressure afterglow has been employed for direct surface analysis by desorption/ionization, whereby, molecules are desorbed and ionized in a single step from the surface of a sample 1 placed in the flowing afterglow of the discharge. Because the interaction area of the flowing atmospheric-pressure afterglow plume is relatively large, as evident by the scale bar 13, the lateral spatial resolution is coarse (~1 mm).

One aspect of the present disclosure is the coupling of a plasma-based AMS source for MSI to laser ablation sampling. Plasma-based sources include direct analysis in real time (DART), dielectric barrier discharge ionization (DBDI), plasma-assisted desorption/ionization (PADI), and flowing atmospheric-pressure afterglow. Cody, R. B.; Laramee, J. A.; Durst, H. D. *Anal. Chem.* 2005, 77, 2297-2302. Na, N.; Zhao, M. X.; Zhang, S. C.; Yang, C. D.; Zhang, X. R. *J. Am. Soc. Mass. Spectrom.* 2007, 18, 1859-1862. Ratcliffe, L. V.; Rutten, F. J. M.; Barrett, D. A.; Whitmore, T.; Seymour, D.; Greenwood, C.; Aranda-Gonzalvo, Y.; Robinson, S.; McCoustrat, M. *Anal. Chem.* 2007, 79, 6094-6101. Andrade, F. J.; Shelley, J. T.; Wetzel, W. C.; Webb, M. R.; Gamez, G.; Ray, S. J.; Hieftje, G. M. *Analytical Chemistry* 2008. Each of these references, is hereby incorporated by reference herein in the entirety, for disclosure related to plasma-based AMS. In one aspect, it was discovered that these AMS sources have a distinct advantage over the previously mentioned ESI and MALDI based techniques in that there are little or no solvent considerations. The plasma sources use either gaseous reagent ions or metastables for ionization, resulting in a wider variety of compounds that can be ionized without changing conditions. Previous attempts to directly obtain spatial information of samples with the FAPA ion source 20 resulted in spatial resolution of ~0.5 mm and allowed for generation of one-dimensional images.

EXAMPLES

The following examples are provided to illustrate particular features of working embodiments. A person of ordinary skill in the art will recognize that the scope of the disclosure is not limited to the particular features recited in these examples.

High-purity He (99.999% ultra high purity helium, Airgas, Radnor, PA) was used in all exemplary experiments. All reagents were analytical-grade.

In one experiment, an atmospheric-pressure glow discharge was formed between a tungsten pin (cathode) and a brass plate (anode). The electrodes were held in a fixed position by a Teflon® bodied cell with a typical electrode gap of ~5 mm. Helium was fed into the discharge chamber through a small orifice in the cell body. All parts of the discharge were sealed to the cell body to ensure that helium would exit only through a hole in the anode. The cell was positioned ~10 mm away from the front plate of the mass spectrometer 30. A helium gas flow of 0.5 to 1.5 L/min through the cell was maintained by means of a mass flow controller (Model FC-280-SAV, Tylan General, Carson, Calif.). A negative DC potential was applied to the cathode in a current-controlled mode through a 2.5 kΩ ballast resistor with a high-voltage power supply (Model DRC-5-400R, Universal Voltronics, Mount Kisco, N.Y.). The plate anode was connected to a DC low-voltage power supply (Model 6299A, Hewlett Packard-Harrison Division, Berkley Heights, N.J.) to create a field-free region between the anode and mass spectrometer interface. The FAPA ion source 20 was mounted on a 3D translation stage for proper alignment with the mass spectrometer 30. Ions were detected by a LECO HT Unique® (LECO Corp. St. Joseph, Mich.) time-of-flight (TOF) mass spectrometer (MS). No adjustments were made to the Unique®.

A Nd:YAG laser ablation sampler (LSX-200, CETAC, Inc., Omaha, Nebr.) operating at 20 Hz was used to ablate material from selected points on a sample 1 surface by employing 266 nm radiation focused to spot sizes between 10 micrometers (μm) and 300 micrometers (μm) in diameter. The aerosolized-nanoparticles generated from the ablation event were then carried in a stream of $N_2$ at 0.3 L/min through a 1 m Teflon® section of tubing into a second chamber where the aerosol was mixed within the afterglow ionization region 12 of the FAPA ion source 20. Molecules were then desorbed from the particles, subsequently ionized, and sampled by the TOF-MS.

In order to generate chemical images of known shapes, an inkjet printer cartridge was emptied and filled with a 2 M solution of caffeine (analyte) and food coloring (for visualization). The cartridge was used with an HP DeskJet 5740 printer (Hewlett-Packard Company, Palo Alto, Calif.) to print images doped with caffeine. The printer with a doped ink cartridge was also used to deposit single droplets (~5 μL) onto a glass slide to perform a calibration. The feed-through mechanism of the print head was disabled and single droplets were dispensed at 300 dpi. Single dots were produced by means of a commercial image processing program which enabled printing of single droplets.

Referring now to FIGS. 5-8, representative mass spectra are shown which were obtained with the laser ablation FAPA configuration described above. The dominant ion is typically the protonated parent molecule, with limited fragmentation observed in some cases. The degree of fragmentation was found to be independent of the laser power. Spectra observed with laser ablation sample introduction were substantially similar to those observed using direct analysis, including dimerization and adduct formation.

Figure 8:
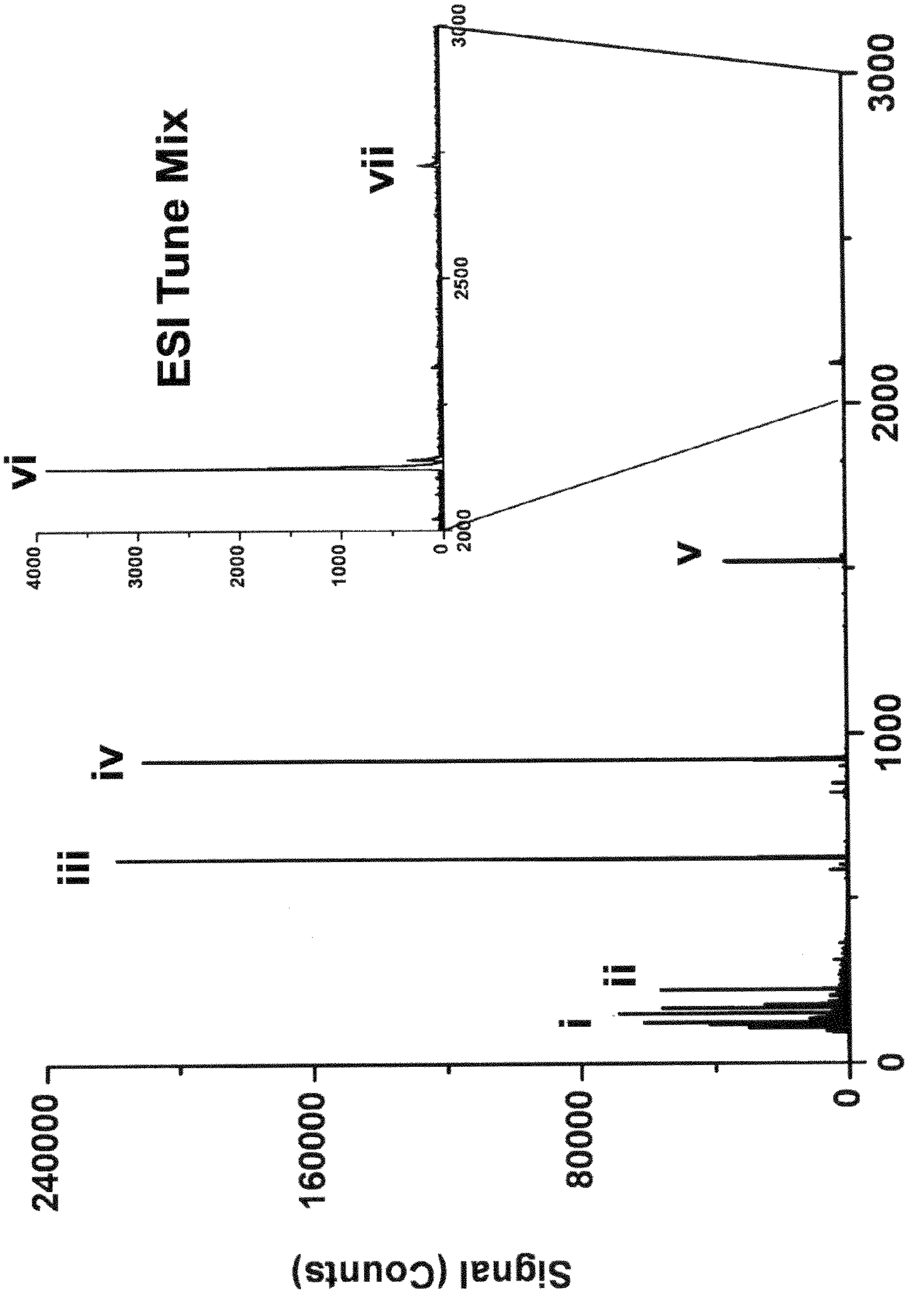
FIG. 8 shows a mass spectrum of a commercial tuning mixture containing betaine (m/z=117.08(i)) and various phosphazines (m/z=321.04(ii) 621.02(iii); 921.00(iv); 1520.96(v); 2120.93(vi); 2720.88(vii)).
Figure 9:
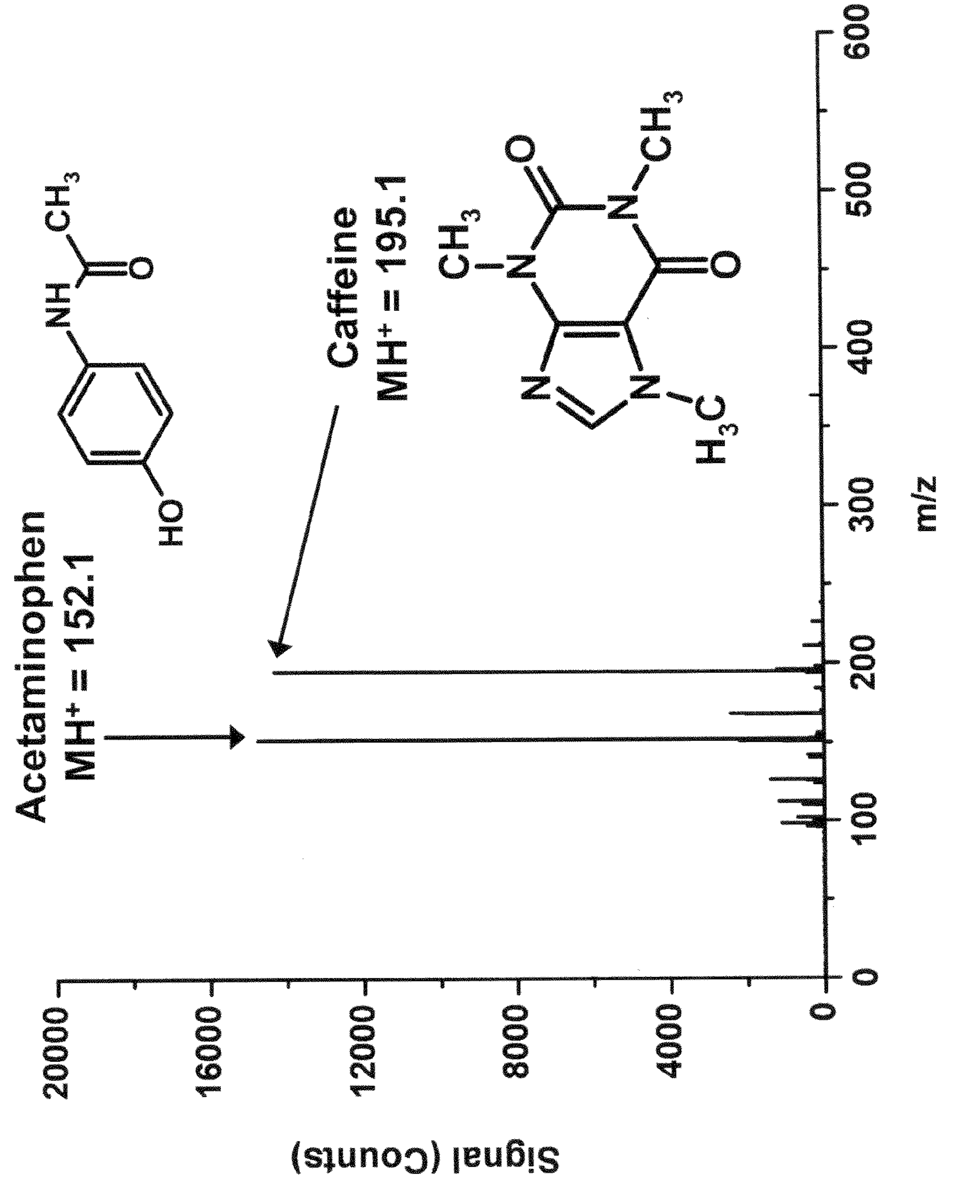
FIG. 9 shows a single-shot laser ablation flowing atmospheric-pressure afterglow mass spectroscopic analysis of a thin film containing caffeine and acetaminophen.
Figure 10:
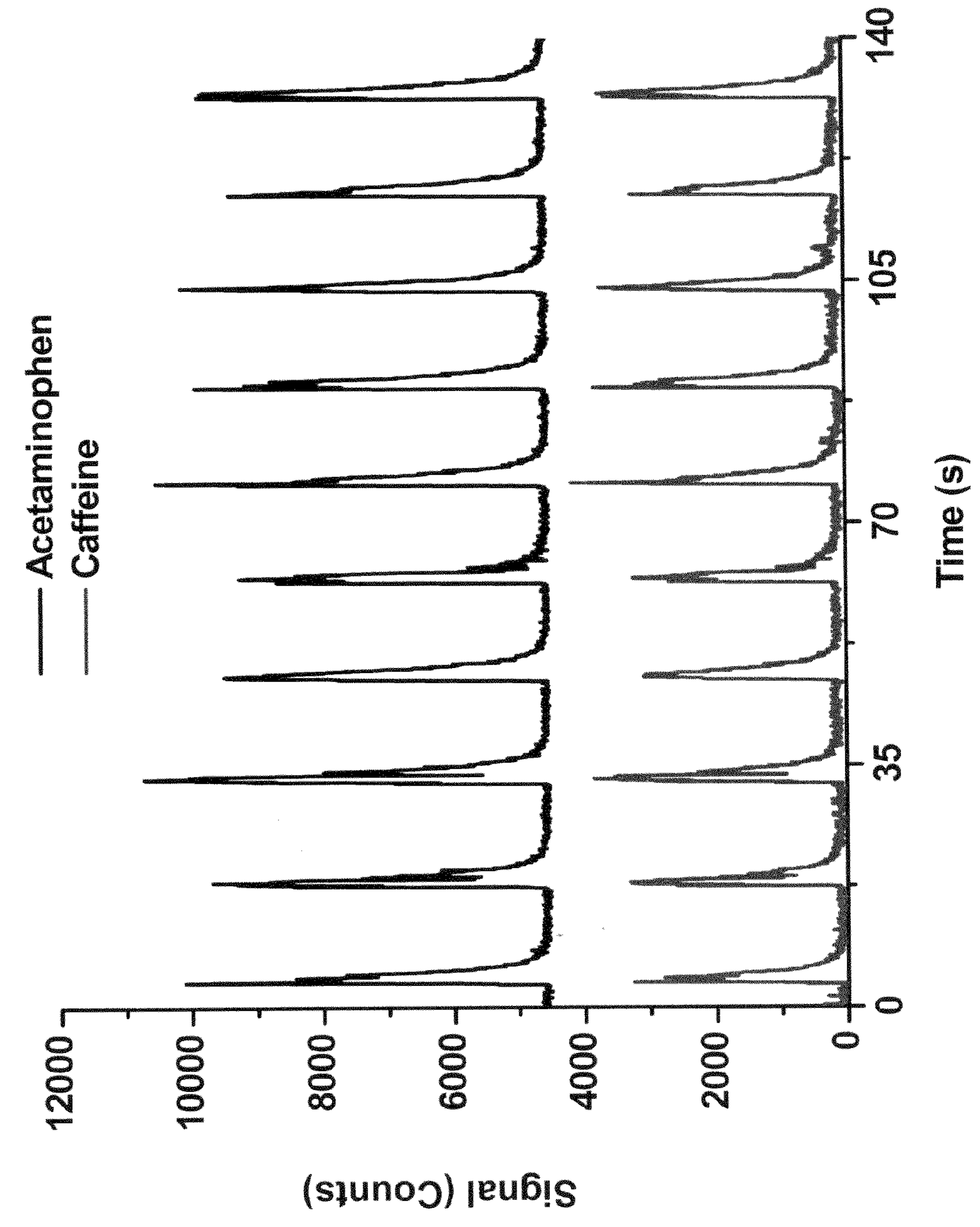
FIG. 10 shows a mass spectrum of a single laser ablation event in which the sample contains caffeine and acetaminophen.

Referring now to FIG. 9, an example of single-shot laser analysis of a spin-coated film of caffeine (MH+=195) and acetaminophen (MH+=152) is shown. Peak widths from each laser pulse were ~1.2 s full-width half maximum (FWHM), and were limited by the washout time of the ablation chamber. By reducing the volume of the chamber by half, the peak widths were reduced to <0.6 s FWHM. Shot-to-shot laser power variations, as well as variability of the film coating, caused single-shot analysis to exhibit significant variability with an RSD of 13%. However, this precision is much better than is typically exhibited by other AMS sources (generally ~40%). Furthermore, when one analyte was used as an internal standard, precision was improved to 3.1% RSD (See FIG. 10). FIG. 8 shows a representative mass spectrum obtained through this example.

Figure 11:
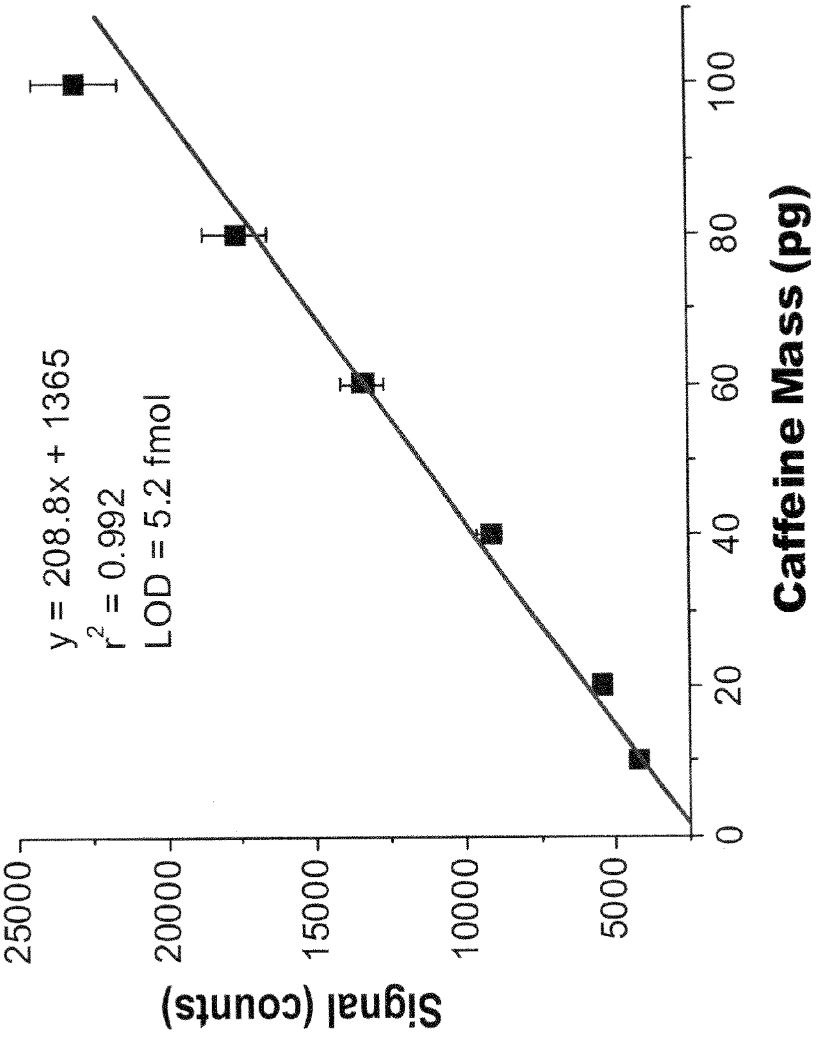
FIG. 11 shows a graph of a calibration curve of caffeine (MH+=195) using laser ablation flowing atmospheric-pressure afterglow mass spectrometry.

Referring now to FIG. 11, a calibration curve that was generated for caffeine by using a modified inkjet printer to deposit 5 pL droplets of solution onto a glass slide is shown. The calibration curve shows linearity ($R^2$=0.992) with ~5% RSD shot-to-shot variation and a limit of detection (LOD) of about 5 fmol. This finding shows that not only is quantitation for AMS possible with this method, but the reproducibility of sampling is dramatically improved over direct sample introduction.

Figures 12A, 12B, 12C:
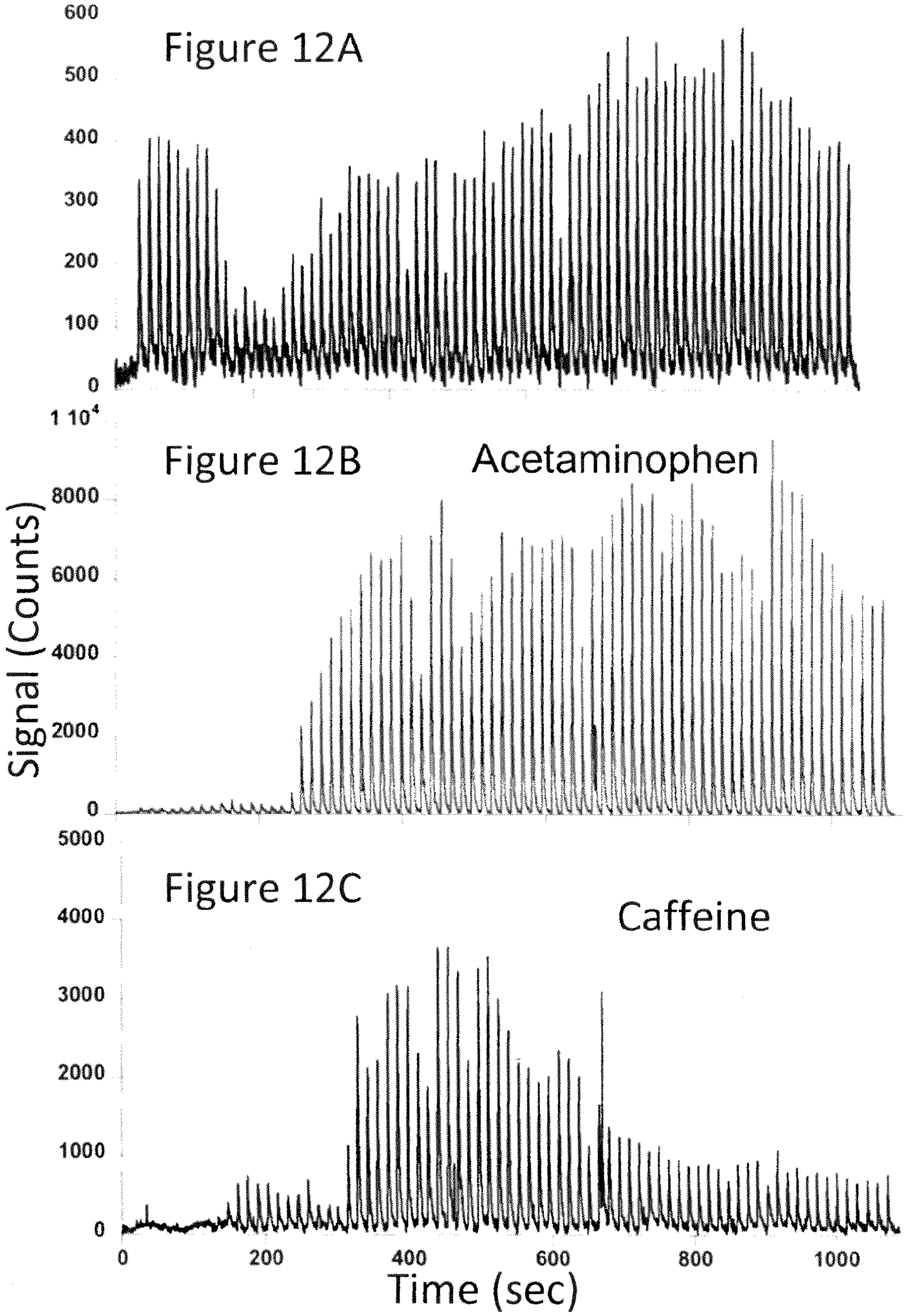
FIG. 12(A-C) show a depth profiling analysis of an Excedrin® tablet, where (A) is the analyte distribution as a function of successive laser shots of mass marker (m/z=110), where (B) is the analyte distribution for acetaminophen (m/z=152), and where (C) is the analyte distribution for caffeine (m/z=195).
Figure 13A:
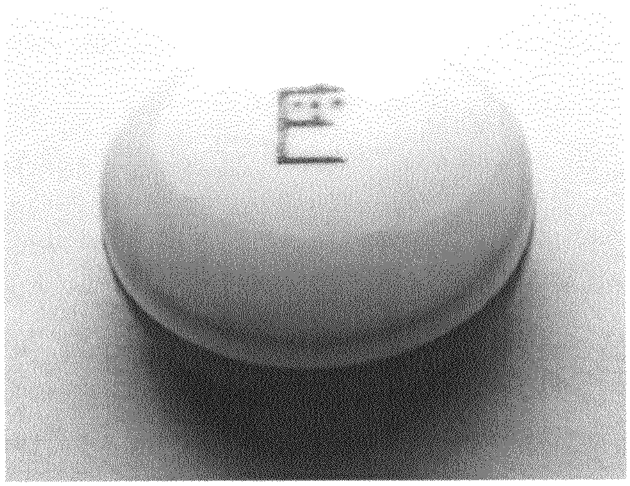
FIG. 13(A-C) are photographs of (A) an Excedrin® tablet after the depth profiling analysis, (B) shows an enlarged view and, (C) is a cross-section.
Figure 13B:
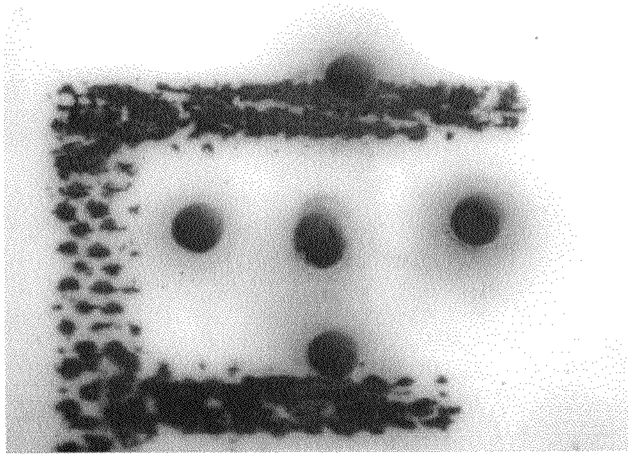
Figure 13C:
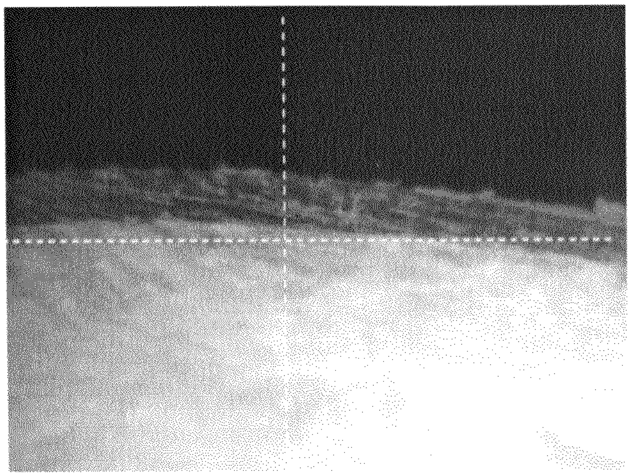

In one exemplary experiment, the laser ablation FAPA mass spectrometer was used to produce a molecular depth profile of a sample 1. The depth profile of an Excedrin® Migraine pharmaceutical tablet was obtained by successive laser pulses that removed a 36 micrometers (μm) layer of material with each burst. After each laser burst, ablated sample 2 was transported to the FAPA ion source 20, desorbed and ionized, and analyzed on the mass spectrometer 30. FIGS. 12A-C show the detection of three different mass-to-charge ratios (m/z) over a given time. The active ingredients, acetaminophen (FIG. 12C) and caffeine (FIG. 12B), were monitored along with an unknown analyte (FIG. 12A). The unknown analyte shown in FIG. 12A was from data collected at a m/z of 110. Its presence on the surface of the tablet indicates it is a constituent of the protective coating of the tablet. The mass proved to be a good indicator for when the laser was being fired. Each signal spike in the figure represents the removal of one layer. It is evident from the presence of active ingredients after 300 s that the laser had resulted in a depression through the protective coating. As illustrated in FIGS. 12B and 12C, the coating layer (from time 0 s to time 300 s) was deficient in both active ingredients. In addition, both caffeine and acetaminophen were heterogeneously distributed in the bulk composition, which would be expected because the tablet is a heterogeneously pressed powder. FIGS. 13A and 13B are photographs of the tablet after the analysis which shows 5 holes where the sample had been ablated. With 75 consecutive laser pulses, the total analysis depth was 2.7 mm, which is significantly deeper than any published MSI configuration. The attainable depth resolution depends on the material being analyzed, laser power, and laser spot size. FIG. 13C shows a cross section of the tablet. In this photograph, the protective coating and the active ingredient region of the tablet can be distinguished.

Figure 14A:
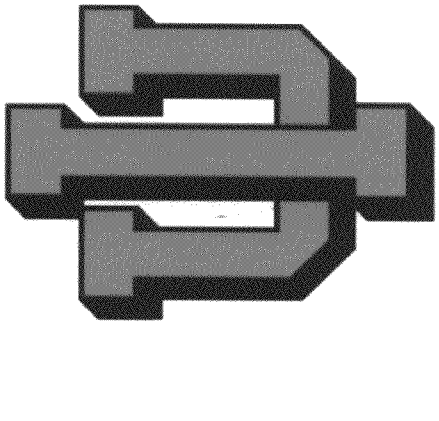
FIG. 14(A-C) are images of (A) a printed logo, (B) the same logo printed with caffeine doped ink and after laser-ablation analysis, and (C) the mass spectral chemical image of caffeine deposited on a surface in the pattern of the logo.
Figure 14B:
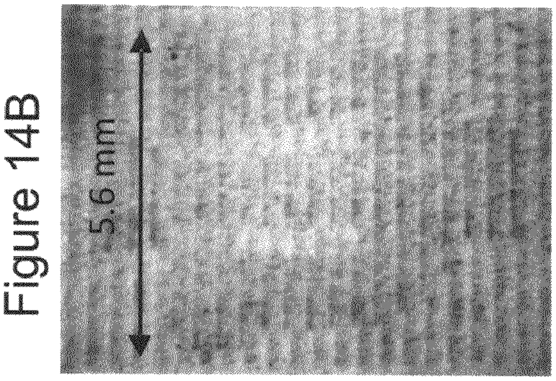
Figure 14C:
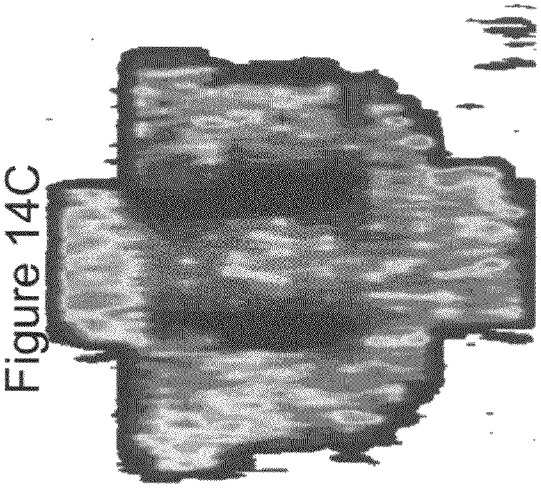

In another exemplary experiment, laser ablation FAPA was used to perform chemical imaging of solid samples. In this experiment, ink doped with caffeine was used to print the Indiana University logo which was 5.6 mm wide (FIG. 14A shows the logo printed in regular ink and FIG. 14B is a photograph of the logo printed with the caffeine-doped ink, after being ablated by the laser). Next the laser was scanned across the print resulting in a time trace. The time trace for m/z 195 was processed and plotted as a contour map by means of a commercial data analysis package resulting in the image of FIG. 14C. The total analysis time for this sample was less than 30 min.

In another exemplary experiment, a 1951 USAF resolution target (FIG. 15A) was printed with the same analyte-doped ink and imaged with the same operating conditions (FIG. 15B). FIG. 15C shows a region of the image in an expanded view. It was found that the horizontal and vertical spatial resolution was 63 micrometers (μm) and 150 micrometers (μm), respectively. Horizontal spatial resolution was limited by the scan speed and washout time of the laser ablation chamber 5, whereas the vertical resolution was limited by the spacing between the scan lines. Improved spatial resolutions (~20 micrometer (μm)) were obtained when a higher concentration of analyte was present.

Figure 16A:
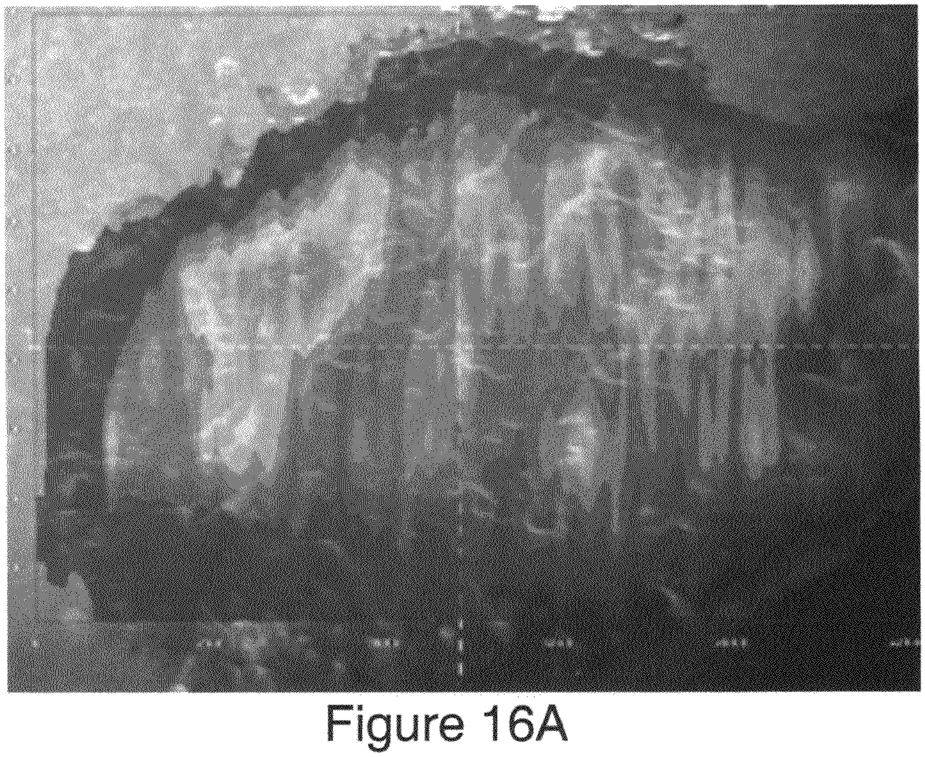
FIG. 16(A-B) show (A) a mass spectral image of 50 nanograms of lidocaine spotted directly on a tissue sample and (B) a white light image of the same tissue sample.
Figure 16B:
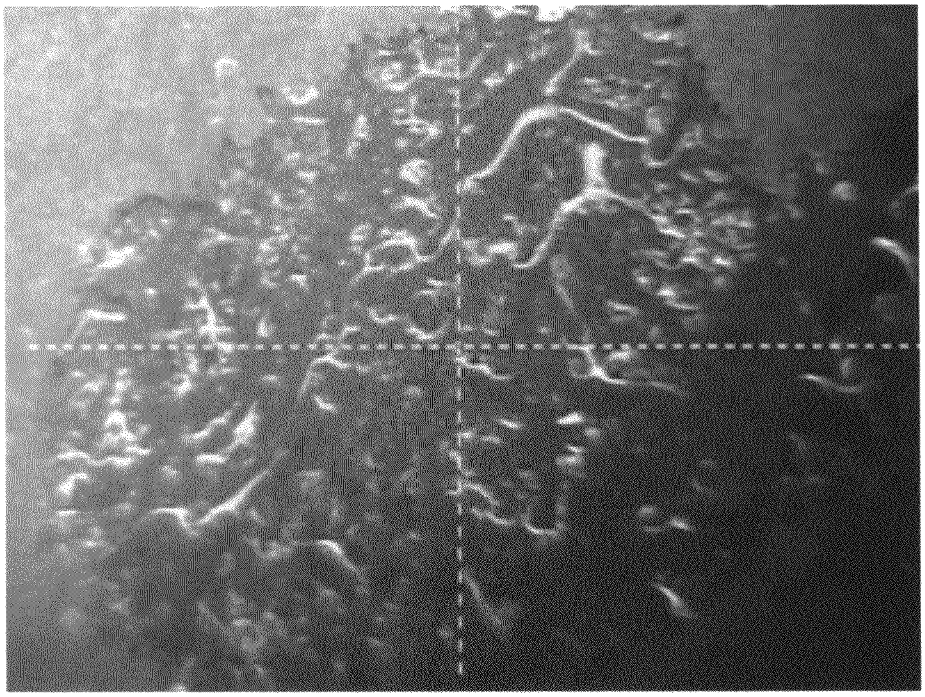
Figure 17A:
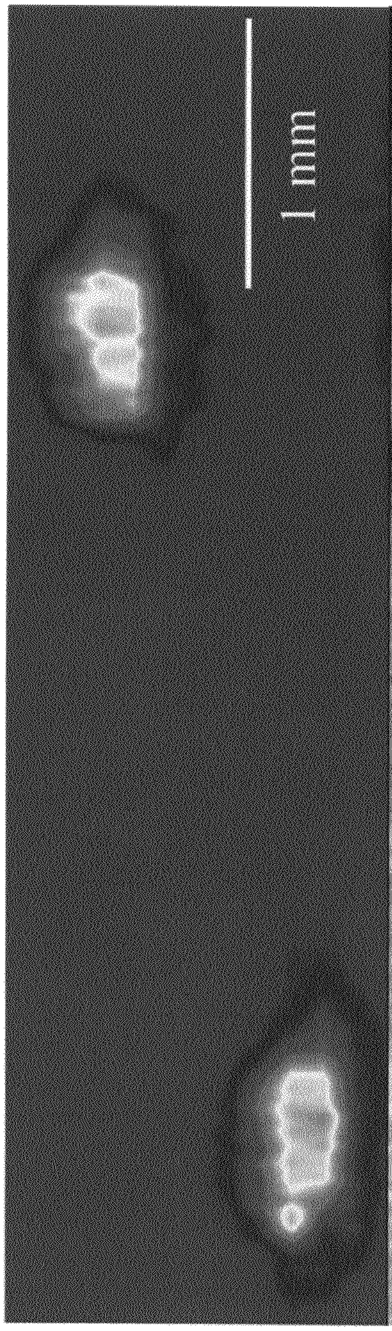
FIG. 17(A-B) show (A) a mass spectral image of a caffeine doped celery sample sliced perpendicular to the stock and (B) a white light image of the same sample.
Figure 17B:
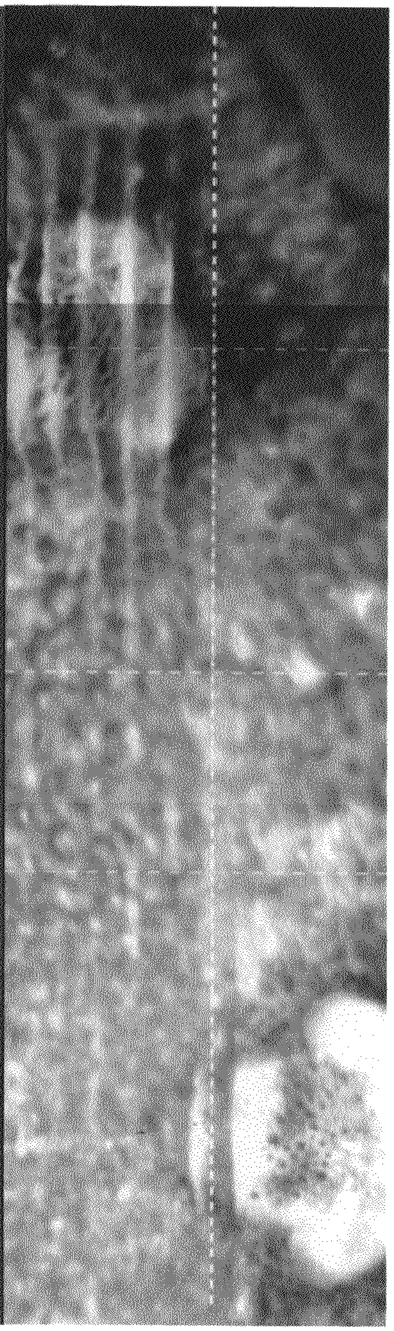

In another exemplary experiment, the MSI technique was used on real tissue samples. The tissue samples were spotted with a solution containing 50 ng of lidocaine and a blue dye for visualization. The tissue was a slice of wet turkey tissue (luncheon meat). FIG. 16A shows the molecular profile of lidocaine on the sample and FIG. 16B shows a white light image of the same sample. The lidocaine was clearly identified in the mass spectrum and the chemical image matches the white light image. FIG. 17A-B demonstrates imaging of celery veins which contained caffeine. A celery stock was placed in an aqueous solution of caffeine and blue dye (for visualization). The celery was cut perpendicular to the stock and imaged. FIG. 17A shows the molecular profile of caffeine on the sample and FIG. 17B shows a white light image of the same sample. The total analysis and data processing time was less than 30 min. The celery veins can very clearly be identified as well as the sheath surrounding the vein.

Coupling laser ablation with FAPA was found to surprisingly be very effective in performing molecular MSI. In addition to imaging, laser ablation allows depth profiling of samples. The combination has been shown not only to be very sensitive (LOD of 5 fmol for caffeine), but allow to allow better spatial resolution (~20 micrometer (μm)) than has been previously achieved with AMS-MSI systems.

There are a plurality of advantages of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of an apparatus and method that incorporate one or more of the features of the present disclosure and fall within the spirit and scope of the present disclosure.

We claim:

1. An apparatus for mass spectrometry comprising a flowing atmospheric-pressure afterglow ion source, a laser ablation sampler, and a mass spectrometer, wherein (a) the laser ablation sampler comprises a laser and a laser ablation chamber configured such that the laser can irradiate a sample to form an ablated sample, (b) the laser ablation sampler and the flowing atmospheric-pressure afterglow ion source are operably connected so that the ablated sample can interact with a reactive species generated by the flowing atmospheric-pressure afterglow ion source, thereby desorbing and ionizing atoms or molecules from the ablated sample to form an ion population having a mass-to-charge ratio distribution, (c) the mass spectrometer is operably connected to the laser ablation sampler and the flowing atmospheric-pressure afterglow ion source so that the ion population is transmitted to the mass spectrometer, wherein the mass spectrometer separates the ion population according to the mass-to-charge ratio distribution, and (d) the flowing atmospheric-pressure afterglow ion source utilizes an atmospheric-pressure, direct current glow discharge plasma.

2. The apparatus of claim 1, wherein the laser ablation sampler is connected to the flowing atmospheric-pressure afterglow ion source by a section of tubing.

3. The apparatus of claim 1, wherein the laser is a UV laser operating in a pulsed mode.

4. The apparatus of claim 1, wherein the laser ablation sampler further comprises an irradiation location modification mechanism, wherein the irradiation location modification mechanism in a first position is configured to irradiate a first location on the sample and the irradiation location modification mechanism in a second position is configured to irradiate a second location on the sample.

5. The apparatus of claim 1, wherein the laser ablation sampler further includes an inlet and an outlet, wherein a flow of gas can be applied to the inlet, the flow of gas propagating through the laser ablation chamber to the outlet and then to the flowing atmospheric-pressure afterglow ion source.

6. The apparatus of claim 1, wherein the flowing atmospheric-pressure afterglow ion source is operated at a set voltage, wherein the set voltage is about 300 Volts.

7. The apparatus of claim 1, wherein the mass spectrometer is a time-of-flight mass spectrometer.

8. A method for analyzing a sample comprising steps of ablating the sample with a laser to form aerosolized nanoparticles, desorbing and ionizing species from the aerosolized nanoparticles with a reactive effluent gas generated by a flowing atmospheric-pressure afterglow ion source to form an ionized species wherein the flowing atmospheric-pressure afterglow ion source utilizes an atmospheric-pressure, direct current glow discharge plasma, and introducing the ionized species into a mass spectrometer, wherein the ionized species have a mass-to-charge ratio distribution, and separating the ionized species by the mass-to-charge ratio distribution.

9. The method of claim 8, wherein desorbing and ionizing molecules does not result in extensive fragmentation.

10. The method of claim 8, wherein ablating the sample includes subjecting a first sample location to a first radiation level such that a first volume of the sample is removed.

11. The method of claim 10, wherein the first volume of the sample removed is between about 0.001 to about 1000 nanoliters.

12. The method of claim 10, wherein the first volume of the sample removed is between about 0.01 to about 10 nanoliters.

13. The method of claim 10, wherein the first level of radiation is within a range of radiation levels, the range of radiation levels consisting of those radiation levels that do not cause significant photobleaching.

14. The method of claim 10, wherein ablating the sample includes changing, in a predetermined manner and after a predetermined time, the first sample location to a second sample location.

15. The method of claim 14, further comprising obtaining the mass-to-charge ratio distribution within the predetermined time to obtain a mass-to-charge ratio distribution time-trace, converting the mass-to-charge ratio distribution time-trace into a mass-to-charge ratio distribution distance-trace, and compiling the mass-to-charge ratio distribution distance-trace into one or more chemical images depicting a concentration of a given atomic or molecular species for a given volume of the sample.

16. The method of claim 10, further comprising ablating a second volume of the sample at a second predetermined time in the first sample location.

17. The method of claim 16, further comprising collecting the mass-to-charge ratio distribution at the second predetermined time to obtain a mass-to-charge ratio distribution time-trace, converting the mass-to-charge ratio distribution time-trace into a mass-to-charge ratio distribution depth-trace, compiling the mass-to-charge ratio distribution depth-trace into one or more chemical images depicting a concentration of a given atomic or molecular species for a given volume of the sample.

18. The method of claim 8, wherein desorbing and ionizing includes the reactive effluent gas selected from a group consisting of $N_2^+$, $([H_2O]_nH^+)$, $NO^+$, $O_2^+$, and $Ar^+$.

19. An analytical instrument for characterization of a sample comprising:

(i) a mass spectrometer, (ii) a flowing atmospheric-pressure afterglow ion source, (iii) a laser, and (iv) a laser ablation chamber, wherein the analytical instrument is configured such that the mass spectrometer receives a population of ions desorbed and ionized upon interaction of an ablated sample with a reactive species population, the reactive species population being formed by the flowing atmospheric-pressure afterglow ion source and the ablated sample being formed by the laser irradiating the sample which is mounted within the chamber, wherein the flowing atmospheric-pressure afterglow ion source utilizes an atmospheric-pressure, direct current glow discharge plasma.

20. The analytical instrument of claim 19, wherein the flowing atmospheric-pressure afterglow ion source includes a first electrode, a second electrode, at least one power supply, a carrier gas supply, a carrier gas inlet, and an afterglow outlet, wherein the first electrode is spaced apart from the second electrode, the at least one power supply is configured to energize the first electrode and the second electrode to form a glow discharge between the first electrode and the second electrode, and the carrier gas inlet introduces the carrier gas supply into the glow discharge such that the reactive species population is formed and carried to the afterglow outlet.

21. The analytical instrument of claim 19, wherein the laser ablation chamber is operably connected to a second chamber that includes an afterglow inlet, an ion outlet, and a sample holder.

22. The analytical instrument of claim 21, wherein the afterglow inlet is configured to deliver the population of reactive species from the flowing atmospheric-pressure afterglow ion source to the second chamber and interact with at least a portion of the ablated sample.

23. The analytical instrument of claim 21, wherein the ion outlet is configured to selectively transmit the population of ions using a combination of ion optics and gas flow controls.

24. The analytical instrument of claim 21 wherein the sample holder is movable.

25. The analytical instrument of claim 21, wherein the sample holder is configured so that it can change a location on the sample irradiated by the laser.

26. The analytical instrument of claim 21, wherein the sample holder is movable in three dimensions.

27. The analytical instrument of claim 21, wherein the sample holder is a microscope stage.

28. The analytical instrument of claim 27, wherein the microscope stage is an inverted microscope stage.

29. The analytical instrument of claim 19, wherein, the mass spectrometer is a time-of-flight mass spectrometer and the laser is a pulsed UV laser.

* * * * *